(12) United States Patent
Sayama

(10) Patent No.: US 8,388,054 B2
(45) Date of Patent: Mar. 5, 2013

(54) STOWABLE VEHICLE SEAT

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 524 days.

(21) Appl. No.: 12/682,058

(22) PCT Filed: Oct. 9, 2008

(86) PCT No.: PCT/JP2008/068386
§ 371 (c)(1),
(2), (4) Date: Apr. 8, 2010

(87) PCT Pub. No.: WO2009/048108
PCT Pub. Date: Apr. 6, 2009

(65) Prior Publication Data
US 2010/0207439 A1    Aug. 19, 2010

(30) Foreign Application Priority Data

Oct. 9, 2007   (JP) ................................ 2007-263227

(51) Int. Cl.
*B60N 2/30* (2006.01)
(52) U.S. Cl. ........ 297/15; 297/331; 297/334; 296/65.09
(58) Field of Classification Search ............... 297/15, 297/331, 332, 334, 335, 65.09, 65.05
See application file for complete search history.

(56) References Cited

U.S. PATENT DOCUMENTS

| | | | |
|---|---|---|---|
| 6,231,101 B1 | 5/2001 | Kamida et al. | |
| 6,595,588 B2 * | 7/2003 | Ellerich et al. | 297/331 |
| 7,201,425 B2 * | 4/2007 | Tsujibayashi et al. | 296/65.09 |
| 7,252,320 B2 * | 8/2007 | Tsujibayashi et al. | 296/65.09 |
| 7,497,517 B2 * | 3/2009 | Gundall et al. | 297/334 |

FOREIGN PATENT DOCUMENTS

| | | |
|---|---|---|
| JP | 3299179 B2 | 7/2002 |
| JP | 2005-225376 A | 8/2005 |
| JP | 2006-082698 A | 3/2006 |

* cited by examiner

*Primary Examiner* — David Dunn
*Assistant Examiner* — Erika Garrett
(74) *Attorney, Agent, or Firm* — Drinker Biddle & Reath LLP

(57) ABSTRACT

There is provided a stowable vehicle seat having an erroneous operation preventive mechanism operating at the time of stowage/restoring operation. A stowable vehicle seat having an operating element using a strap for stowage/restoring operation includes brackets formed on a seat back frame, a rocking member rockably supported on the brackets, and a braking member fixed to the strap. The brackets each have an elongated hole extending in the up/down direction. The rocking member includes right and left plate bodies, each having a braking hole that is long in the up/down direction, and an upper plate connecting the plate bodies to each other. The upper plate comes into sliding contact with the strap on its lower side. The braking holes each have an expanded-width part on their front side. The braking member has the erroneous operation preventive mechanism formed being inserted through both of the elongated holes and the braking holes.

5 Claims, 20 Drawing Sheets

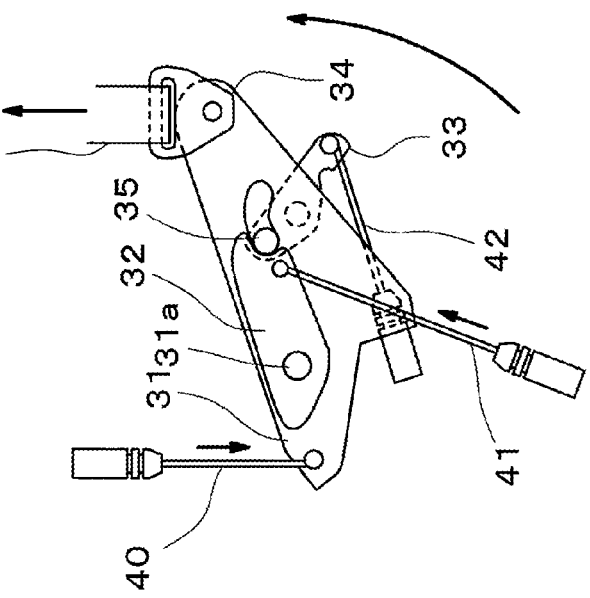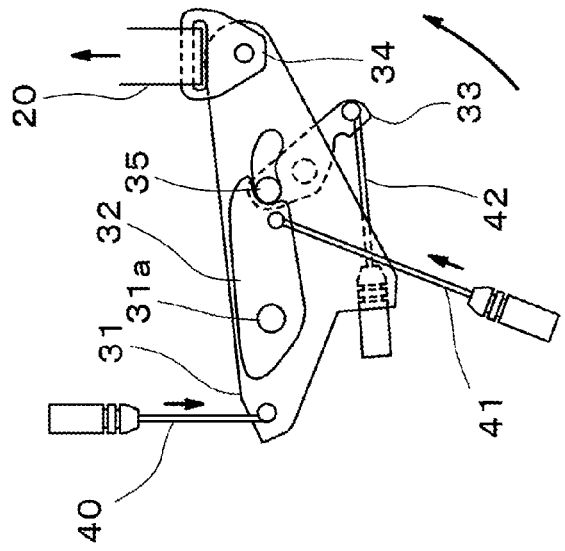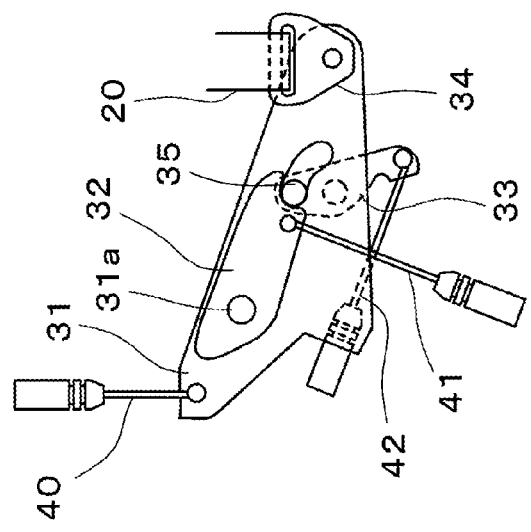

FIG. 18A
FIG. 18B
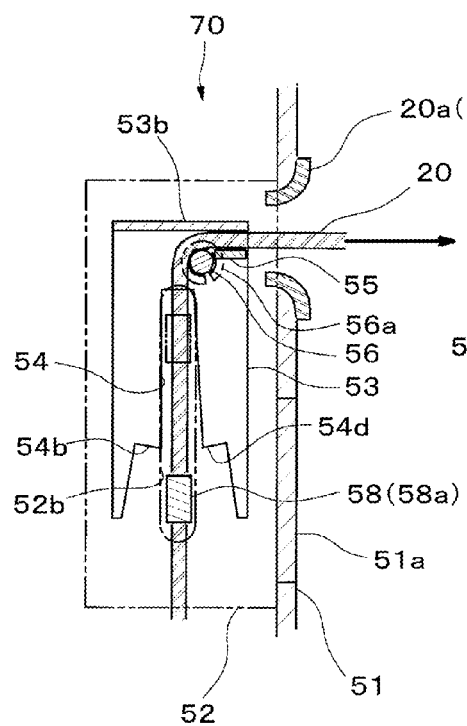
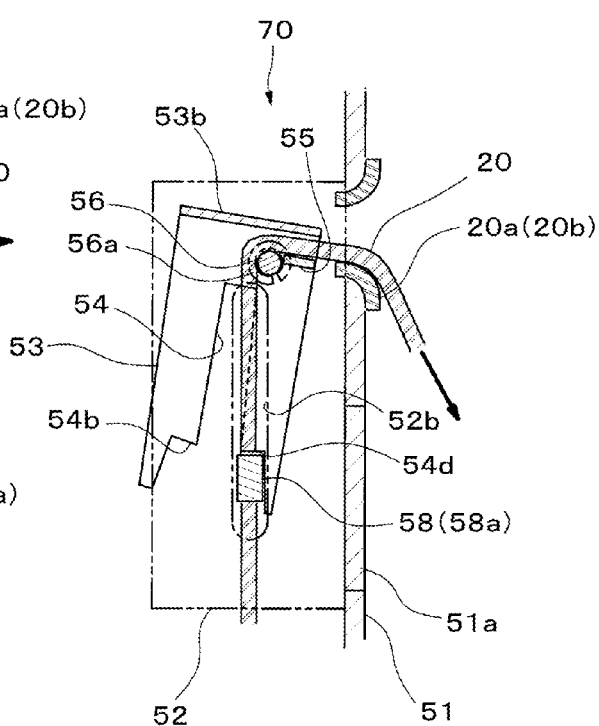

STOWABLE VEHICLE SEAT

CROSS-REFERENCE TO RELATED APPLICATIONS

This application is the U.S. national phase of the International Patent Application No. PCT/JP2008/068386 filed Oct. 9, 2008, which claims the benefit of Japanese Patent Application No. 2007-263227 filed Oct. 9, 2007, the entire content of which is incorporated herein by reference.

BACKGROUND

Various embodiments of the present invention relate to a stowable vehicle seat and, more particularly, to a stowable vehicle seat having an erroneous operation preventive mechanism for performing stowing/restoring operation with certainty.

Conventionally, there has been known a stowable vehicle seat in which—in the state in which the rear end part of a seat cushion constituting a vehicle seat is supported to be rotatable in the front and rear direction on the front side of a stowage recess (storage recess) in vehicle body floor, and a seat back is folded over the seat cushion—the vehicle seat can be rotated to the rear and stowed in the stowage recess.

For example, as disclosed in Japanese Unexamined Patent Application Publication No. 2006-82698 ("the '698 Publication"), rotating shafts are provided in both right and left side edge parts in the front part of the stowage recess and brackets are provided in right and left parts of the rear end part of the seat cushion, and the brackets are disposed to be rotatable in the front and rear direction with respect to the turning shafts, whereby the seat can be stowed in the stowage recess by supporting the rear end part of the seat cushion to be rotatable in the front and rear direction.

In the above-described technique, the operating element for a reclining mechanism (reclining lock) and a leg locking releasing mechanism (striker lock) operated when the stowable vehicle seat is stowed (stored) and restored is separated for each mechanism. As the operating element for the reclining mechanism and the leg locking releasing mechanism, a pulling strap (strap) and a lever are used. These operating element are provided on the back surface side of the seat that lies beyond the passenger's reach in the seated state to prevent erroneous operation performed by a child or the like.

Also, of the two operating element operated when the stowable vehicle seat is stowed and restored, the operating element for the reclining mechanism sometimes uses the strap. The strap is extended from the back surface of the seat, and releases the locking of the reclining mechanism by being pulled.

The locking releasing operation of the reclining mechanism using the strap is performed by pulling the strap to the rear side of the seat from the cargo room side by an operator. Since the strap is usually mounted on the seat back surface side as described above, there is no fear of erroneous operation.

However, the mechanism is configured so that the locking of the reclining mechanism is released likewise by pulling the strap upward or downward. Therefore, in the case where, for example, a child or the like performs strap operation by putting out his/her hand in the state of being seated with his/her back turned, the locking of the reclining mechanism may be released.

Further, even for a seat in which the operating element separated for each function of the reclining locking releasing mechanism and the leg locking releasing mechanism are integrated into one operating element, the strap is sometimes used. In this case as well, the same problem as that with the above-described technique occurs.

SUMMARY

Various embodiments of the present invention have been made to solve the above problems, and accordingly an object thereof is to provide a stowable vehicle seat having an erroneous operation preventive mechanism for performing stowage/restoring operation with certainty.

Another object is to provide a stowable vehicle seat having an erroneous operation preventive mechanism that is effective even at a time of seat arrangement other than the stowage/restoring operation.

To achieve the above objects, a stowable vehicle seat comprises an erroneous operation preventive mechanism using a strap for operation at a time when the stowable vehicle seat is folded, the erroneous operation preventive mechanism including a braking member fixed to the strap of the stowable vehicle seat; at least two brackets that are raised in any direction on top and back surface sides of a seat back of the vehicle seat and are formed separately from each other; and a rocking member having at least two plate bodies that are pivotally supported on the brackets to be rockable by a rocking shaft and are formed separately from each other, and a connector that connects the plate bodies to each other and comes into sliding contact with the strap, at least one of the brackets being provided with a first elongated hole extending in the direction intersecting with the rocking direction of the rocking member, the plate body of the rocking member being formed so that a second elongated hole extending in the direction intersecting with the rocking direction has an expanded-width part extending to a side reverse to the rocking direction of the rocking member due to the sliding contact of the strap with the connector, and the braking member of the strap being inserted through the first elongated hole and the second elongated hole.

Thus, the configuration is made such that the erroneous operation preventive mechanism has the braking member fixed to the strap; the rocking member having the connector come into sliding contact with the strap; and the brackets each having the first elongated hole extending in a direction intersecting with the rocking direction of the rocking member, the plate body of the rocking member is formed so that the second elongated hole extending in the direction intersecting with the rocking direction has the expanded-width part extending to the side reverse to the rocking direction of the rocking member due to the sliding contact of the strap with the connector, and the braking member of the strap is inserted through the first elongated hole and the second elongated hole. Therefore, when the strap is pulled upward or downward with respect to the seat back, the strap comes into sliding contact with the connector and the rocking member rocks, so that the braking member fixed to the strap is locked to the expanded-width part to regulate the movement of the strap. Thereby, when the strap is pulled to some direction such as upward or downward by improper or unintentional operation or the like, the operating force is not transmitted to the link mechanism, the seat movement that is not expected by the passenger can be prevented, and certain operability can be assured. Further, since the strap pulling direction such that the erroneous operation preventive mechanism operates is the direction relative to the seat back, even in the state in which the seat is arranged at the stowage/restoration position and the like, the erroneous operation preventive mechanism operates in the same way, and therefore certain operability can be assured.

It is preferable that the connector of the rocking member be disposed to come into sliding contact with the strap on the side on which the expanded-width part is formed.

Since the connector comes into sliding contact with the strap on the side on which the expanded-width part is formed as described above, when the strap is pulled upward with respect to the seat back, the braking member fixed to the strap is locked to and regulated by the expanded-width part. Therefore, the operating force of the strap is not transmitted to the link mechanism, the seat movement that is not expected by the passenger can be prevented, and certain operability can be assured.

It is preferable that the connector of the rocking member be disposed to come into sliding contact with the strap on the side reverse to the side on which the expanded-width part is formed.

Since the connector comes into sliding contact with the strap on the side reverse to the side on which the expanded-width part is formed as described above, when the strap is pulled downward, the braking member fixed to the strap is locked to the expanded-width part. Therefore, the operating force of the strap is not transmitted to the link mechanism, the seat movement that is not expected by the passenger can be prevented, and certain operability can be assured.

It is preferable that the second elongated hole have an expanded-width part on both sides of the rocking direction, and the strap is inserted between the connector and the rib to come into sliding contact with both of the connector and the rib.

Thus, by forming the expanded-width part on both sides of the rocking direction, the braking member fixed to the strap is locked to the expanded-width part even when the strap is pulled to either direction of upward and downward directions with respect to the seat back. Therefore, the operating force of the strap is not transmitted to the link mechanism, the seat movement that is not expected by the passenger can be prevented, and certain operability can be assured.

The configuration may be made such that by pulling the strap to the upside or the downside of the seat back, the connector or the rib is brought into sliding contact with the strap, and by rocking the rocking member to the back surface direction or to the top surface direction of the seat back, the braking member is locked to the expanded-width part, whereby the movement of the strap is regulated. Thereby, the seat movement that is not expected by the passenger can be prevented, and certain operability can be assured.

According to the stowable vehicle seat having the erroneous operation preventive mechanism in accordance with various embodiments of the present invention, by making the configuration such that the strap pulling operation at the stowage/restoration time of vehicle seat cannot be performed in some direction, in case of erroneous operation, the seat movement that is not expected by the passenger can be prevented, and certain operability can be assured.

Also, in the case of seat arrangement as well, the strap cannot be pulled in some direction, so that the seat movement that is not expected by the passenger can be prevented, and certain operability can be assured.

BRIEF DESCRIPTION OF THE DRAWINGS

Various embodiments of the invention are described in more detail below and illustrated by the following drawings.

FIGS. 11A-11C are explanatory side views for explaining operation of a link mechanism at the time of stowing operation of a seat in accordance with a first embodiment of the present invention;

FIGS. 18A, 18B are explanatory side views for explaining operation of a stopper mechanism in accordance with a second embodiment of the present invention;

DETAILED DESCRIPTION OF THE EMBODIMENTS

Embodiments of the present invention will now be described with reference to the accompanying drawings. Needless to say, the members, arrangements, and the like described below do not restrict the present invention, and can be modified and changed variously in light of the teachings of the present invention.

First Embodiment

FIGS. 1 to 16 show a first embodiment of the present invention. First, the configuration of a seat S, S1 in accordance with this embodiment is explained with reference to FIGS. 1 to 4.

A vehicle equipped with the seat S of this embodiment has three-row seats arranged in the front and rear direction, and the seat of the third row is configured to be stowable. The seat S in accordance with this embodiment relates to the third-row seat. At the rear of the seat S, a stowage recess 5 serving as a stowage area for stowing the seat S is provided in a vehicle body floor 4. A floor carpet (not shown) is laid throughout almost the entire surface of the vehicle floor 4.

Figure 1:
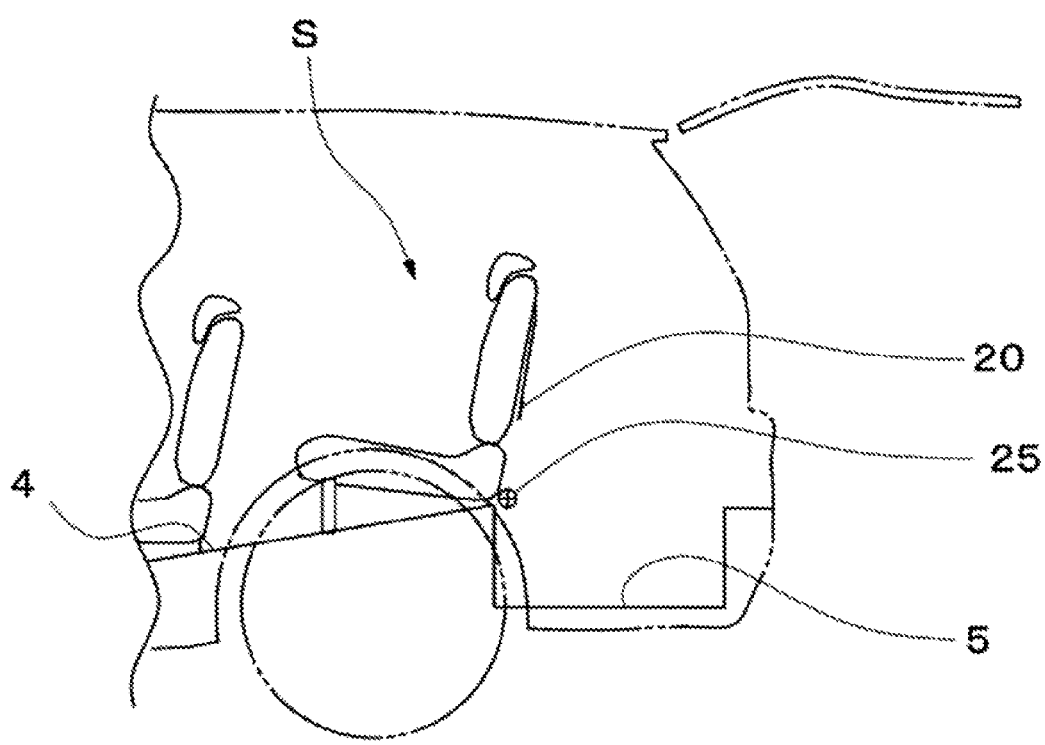
FIG. 1 is a schematic side view of a vehicle rear part equipped with a stowable vehicle seat in accordance with an embodiment of the present invention.
Figure 2:
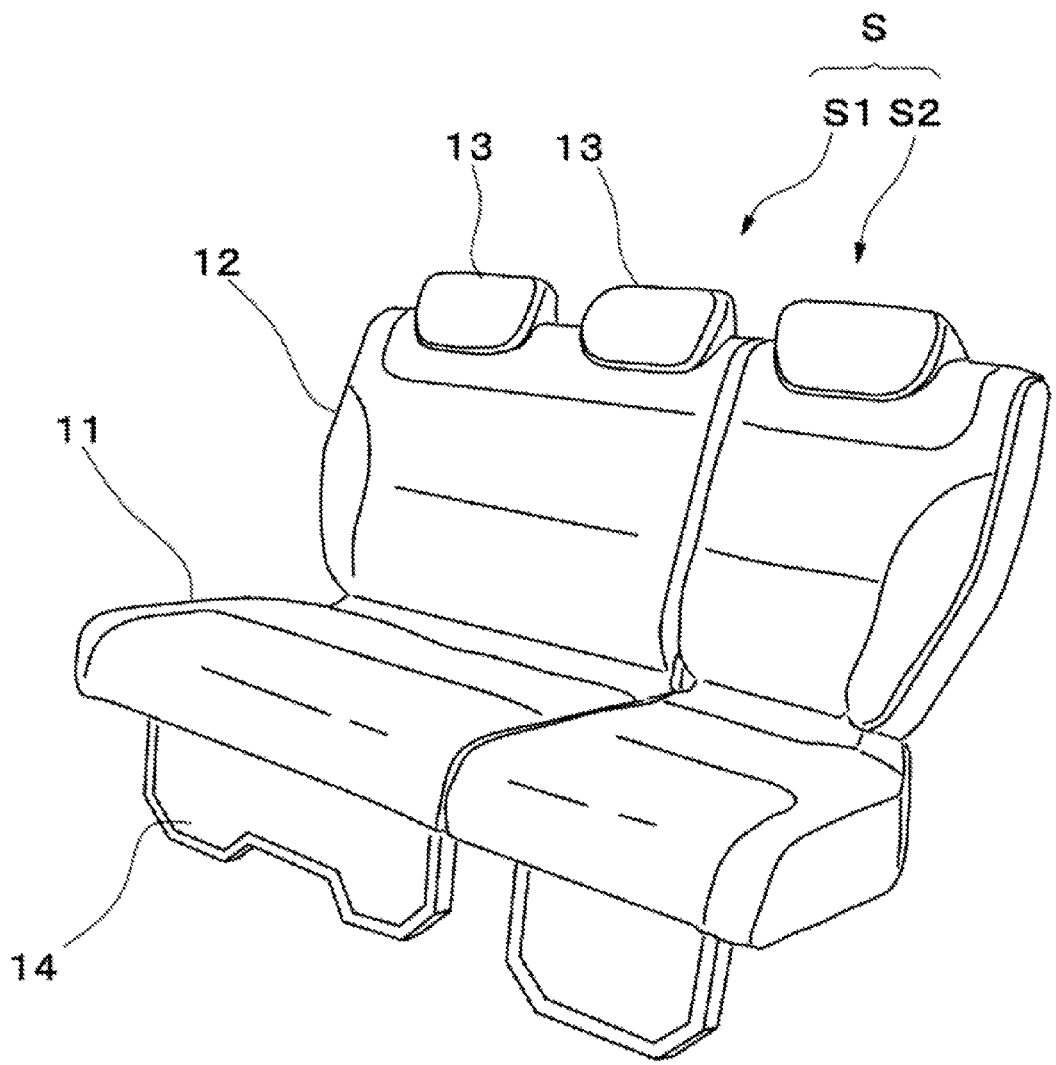
FIG. 2 is a front perspective view of a seat in accordance with a first embodiment of the present invention.

FIG. 2 schematically shows the seat S in accordance with an embodiment of the present invention. The seat S has three seats in the right and left direction, and is configured by a right seat 51 for two persons, which is located on the right-hand side with respect to the vehicle travel direction, and a left seat S2 for one person.

In the description below, the right-hand side and the left-hand side showing the direction are referred to with respect to the vehicle travel direction.

Also, since the stowage mechanisms and operating methods of the right seat S1 and the left seat S2 are the same, in the explanation below, for convenience, explanation is given by taking the right seat S1 as the seat S.

Figure 3:
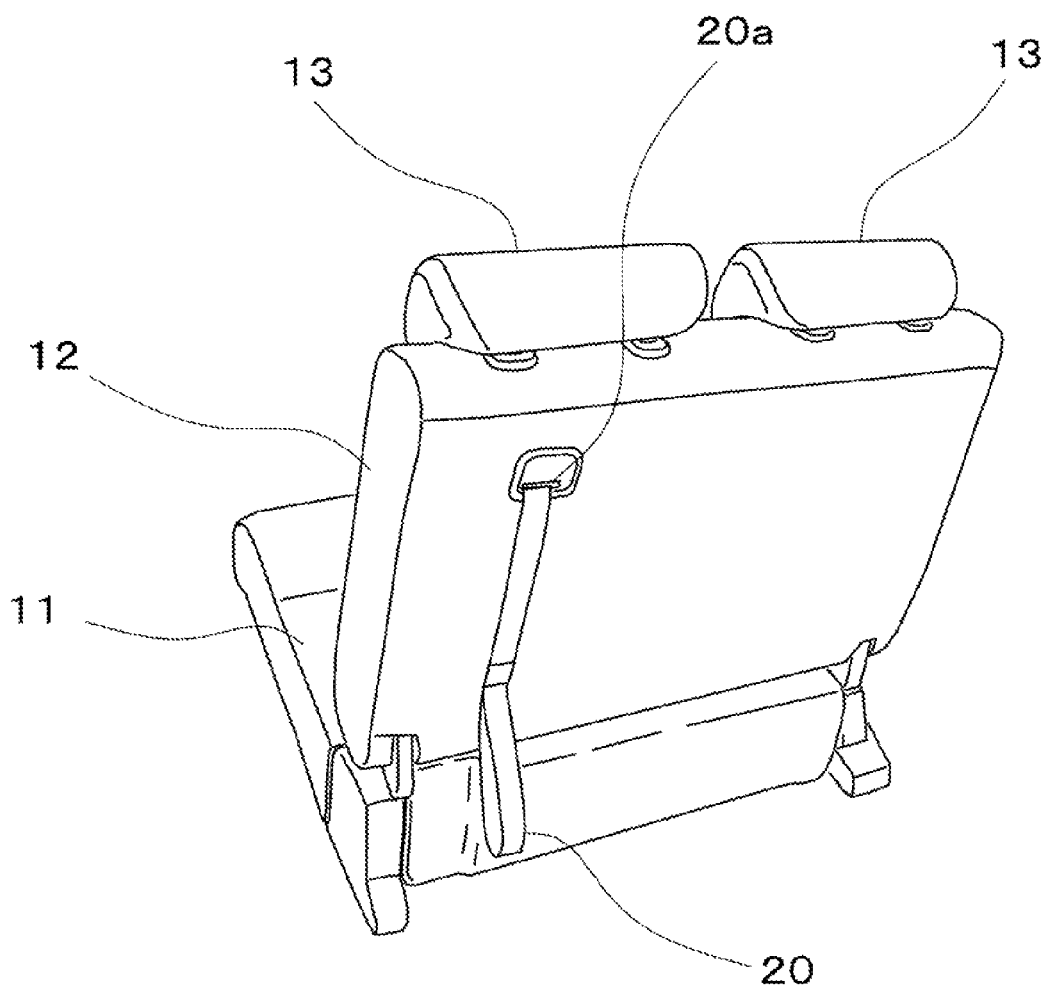
FIG. 3 is a rear perspective view of a seat in accordance with a first embodiment of the present invention.

The seat S is made up of a seat cushion 11, a seat back 12, headrests 13, 13, and a front leg 14. Also, as shown in FIG. 3, from the back side of the seat back 12, a strap 20 for performing the stowage/restoring operation of the seat S is extended from the back surface side of the seat S to the outside.

For the seat S in accordance with this embodiment, the operating element for the reclining locking releasing mechanism and the leg locking releasing mechanism operated when the stowable vehicle seat is stowed and restored are integrated into one element as the strap 20.

The strap 20 is an operating element operated at the time of stowage/restoring operation of the seat S, and is configured so that a flexible wide belt having a length of about 1 m is extended from a strap outlet part 20a to the other side to facilitate operation performed by a passenger. The stowage/restoring operation of the seat S can be performed by the pulling operation of the strap 20 so that the operation load can be reduced as compared with the operation using a lever. In the state in which the stowage/restoring operation of the seat S is not performed, a part of the strap 20 is hooked to a planar fastener on the back surface of the seat back 12. In this embodiment, the strap 20 serving as the operating element is configured to be of a belt form.

Figure 4:
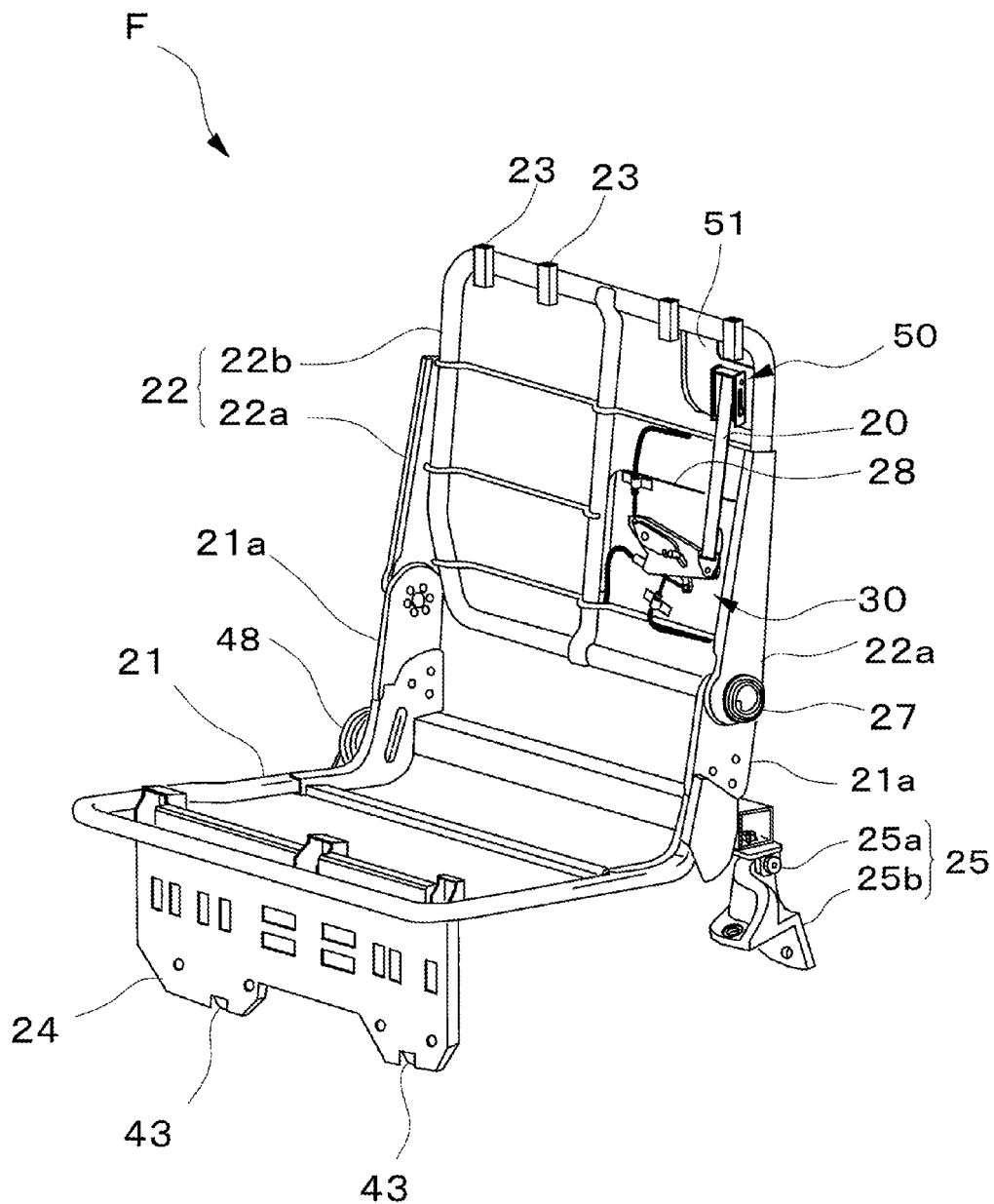
FIG. 4 is a schematic perspective view of a seat frame in accordance with a first embodiment of the present invention.
Figure 5:
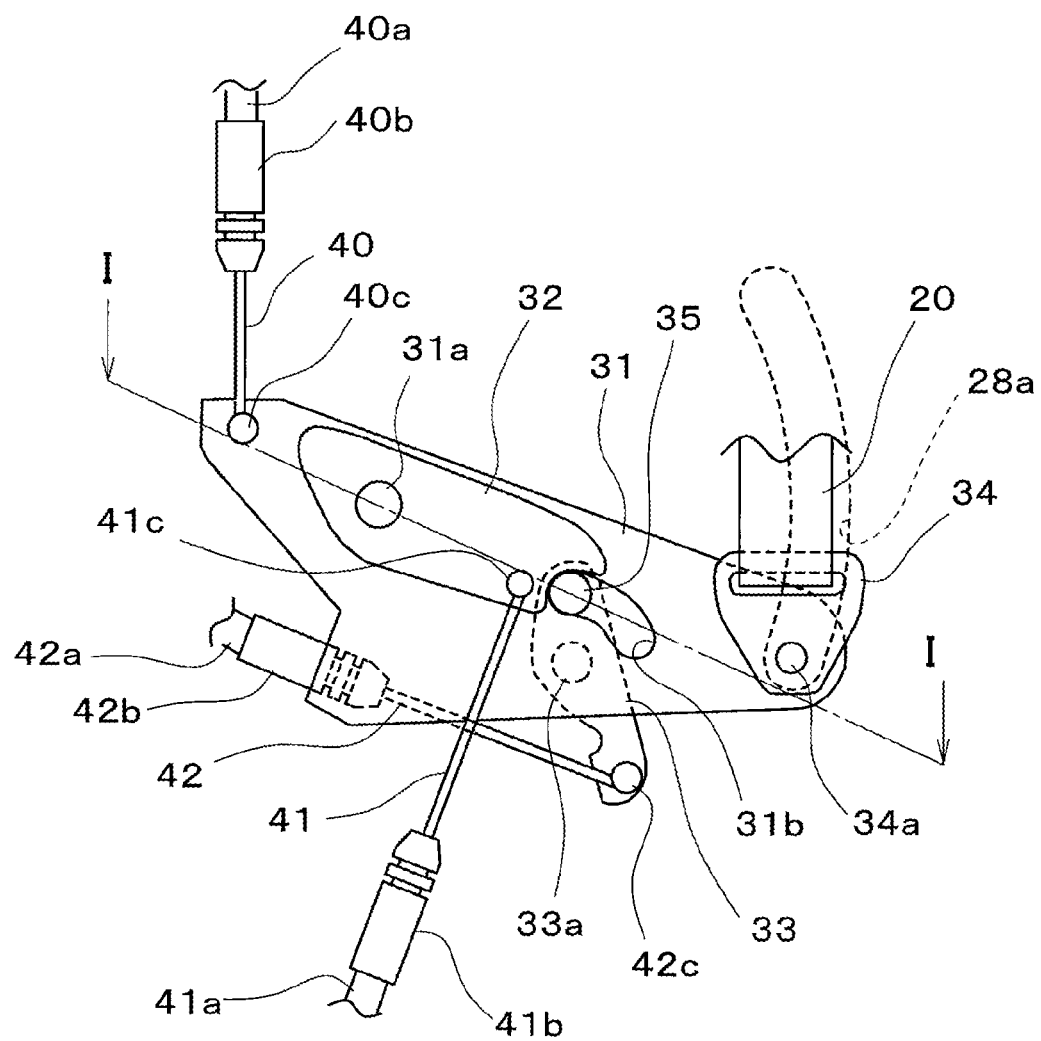
FIG. 5 is an enlarged explanatory side view of a link mechanism in accordance with a first embodiment of the present invention.
Figure 6:
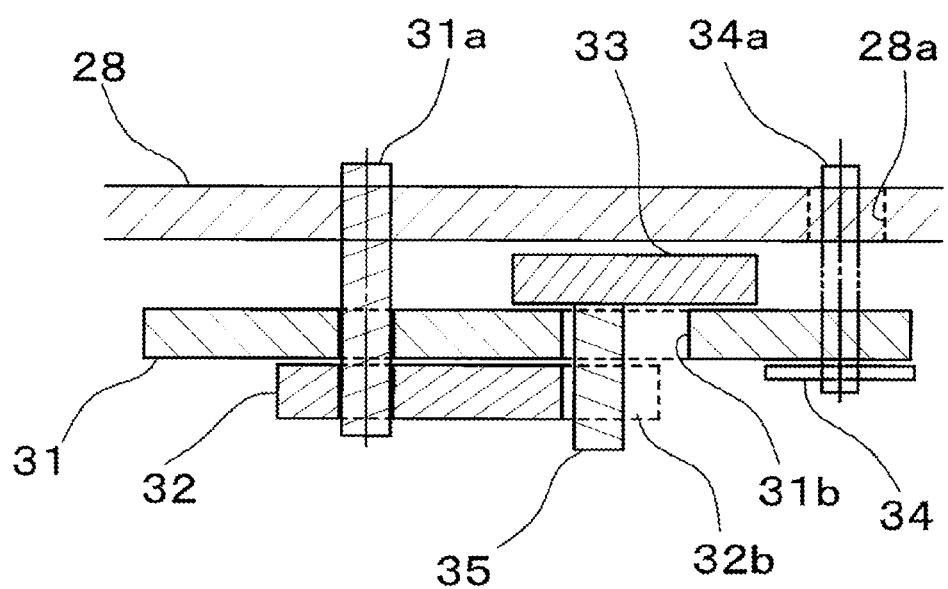
FIG. 6 is a sectional explanatory view of a link mechanism in accordance with a first embodiment of the present invention, the view being taken along the line I-I of FIG. 5.
Figure 7:
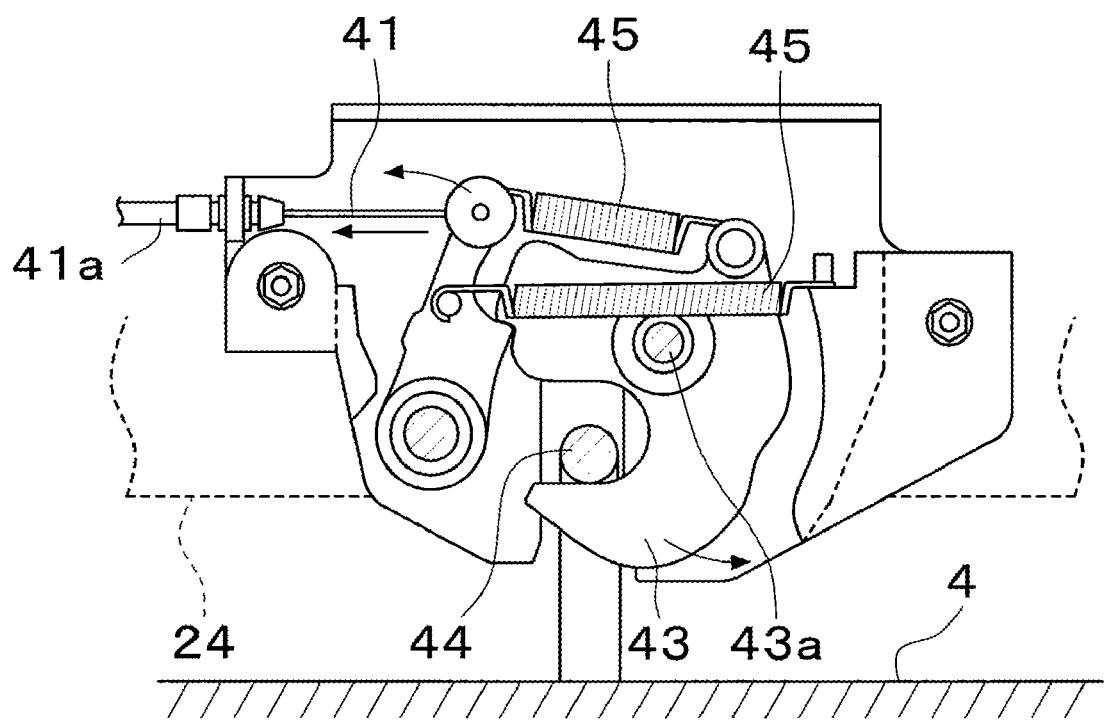
FIG. 7 is a schematic explanatory side view of a locking part of a front leg in accordance with a first embodiment of the present invention.

A seat frame F of the seat S shown in FIG. 4 includes a seat cushion frame 21 constituting the seat cushion 11, a seat back frame 22 constituting the seat back 12, and a front leg frame 24. Also, in the upper part of the seat back frame 22, pillars for headrest frames (not shown) are disposed via pillar support parts 23.

The front leg frame 24 is used to constitute the front leg 14 that is covered by a cover material (not shown) and serves as a second seat support, and is connected to the vehicle body floor 4 side to support the front side of the seat cushion frame 21 as described above. The front leg frame 24 is supported, in the upper part thereof, on the front side of the seat cushion frame 21 to be rotatable in the front and rear direction, and in the lower part of the front leg frame 24, locking claws 43, 43, that are connected to a leg striker 44 provided on the vehicle body floor 4 side to be engageable and disengageable are provided at two places. In this embodiment, the configuration is made such that the locking claws 43 are provided at two places at the right and left. However, the configuration may be made such that either one of the right and left locking claws 43 is provided, or one locking claw 43 is provided at one place in the central portion.

The seat cushion frame 21 is used to constitute the seat cushion 11 that is covered by a cushion pad, a cover, or the like (not shown) and supports the passenger from the lower side. The front side of the seat cushion frame 21 is supported on the vehicle body floor 4 side by the front leg frame 24. The rear end part side of the seat cushion frame 21 is supported on seat support parts 25 serving as first seat support rotatable in the front and rear direction with respect to rotating shaft brackets 25b fixed to the vehicle body floor 4 side via a rotating shaft 25a. To the seat support part 25, a spiral spring 48 is mounted to urge the seat cushion 11 to the forward rotating direction and to buffer the shock at the stowage time.

Also, in the rear end part of the seat cushion frame 21, back frame support parts 21a, 21a, connected to the seat back frame 22 are provided.

The seat back frame 22 is used to constitute the seat back 12 that is covered by a cushion pad or the like (not shown) and supports the passenger's back from the rear, and in this embodiment, comprises a substantially rectangular frame body. More specifically, the seat back frame 22 is formed by two side frames 22a, 22a, which are disposed to be separate in the right and left direction and extend in the up and down direction, and a central frame 22b, which is the substantially rectangular frame body held between the side frames 22a, 22a.

The lower end part side of the side frame 22a, 22a is connected to the back frame support part 21a, 21a via a reclining mechanism 27.

On the inside of the central frame 22b, which is the frame body, a substantially plate-shaped back plate 28 and a stopper bracket 51 are disposed along the plane for supporting the passenger's back. On the back plate 28, a link mechanism 30, described below, is provided. Also, on the stopper bracket 51, a stopper mechanism 50, described below, is provided.

Next, referring to FIGS. 5 to 11, the configuration of the link mechanism 30, the stowage/restoring operation of the seat S, and the operation of the link mechanism 30 are explained.

First, referring to FIGS. 5 to 9, the configuration of the link mechanism 30 is explained.

The link mechanism 30 is connected to the strap 20 operated at the time of stowage/restoration of the seat S, and has a function of appropriately releasing the rotating of the reclining mechanism 27 and the locked state of the front leg 14 to the vehicle body floor 4 in association with the operation of the strap 20 and the state of the seat S. As described above, the link mechanism 30 is formed on the back plate 28.

The link mechanism 30 is configured to have a first link member 31, a second link member 32, and a third link member 33, which are rotatably supported, and a power transmitting member is connected to each of the link members. These link members are configured to be operated in association with each other according to the state between the power transmitting members and the operation between the link members.

As the power transmitting members, there are provided a reclining releasing wire 40 connected to the reclining mechanism 27, the strap 20 serving as the operating element, a leg releasing wire 41 connected to the locking claw 43 of the front leg 14, and a cancel wire 42 for detecting the folded state of the reclining mechanism 27.

The first link member 31 is a substantially inverse triangular member that is flat in the right and left direction. To a locking part 40c provided on one end part side of the first link member 31, the reclining releasing wire 40 serving as the power transmitting member is locked, and to a locking part 34a provided on the other side of the first link member 31, the strap 20 is locked via a strap connecting member 34, so that the first link member 31 is rotatably supported on the back plate 28 by a first shaft part 31a provided between the locking parts 40c and 34a.

Also, between the first shaft part 31a and the locking part 34a, an arc-shaped elongated hole 31b is formed to draw a circle concentric with a second shaft part 33a, described below.

The other end part sides of the reclining releasing wire 40 locked to the first link member 31 as the power transmitting member and the strap 20 are explained below.

Figure 8:
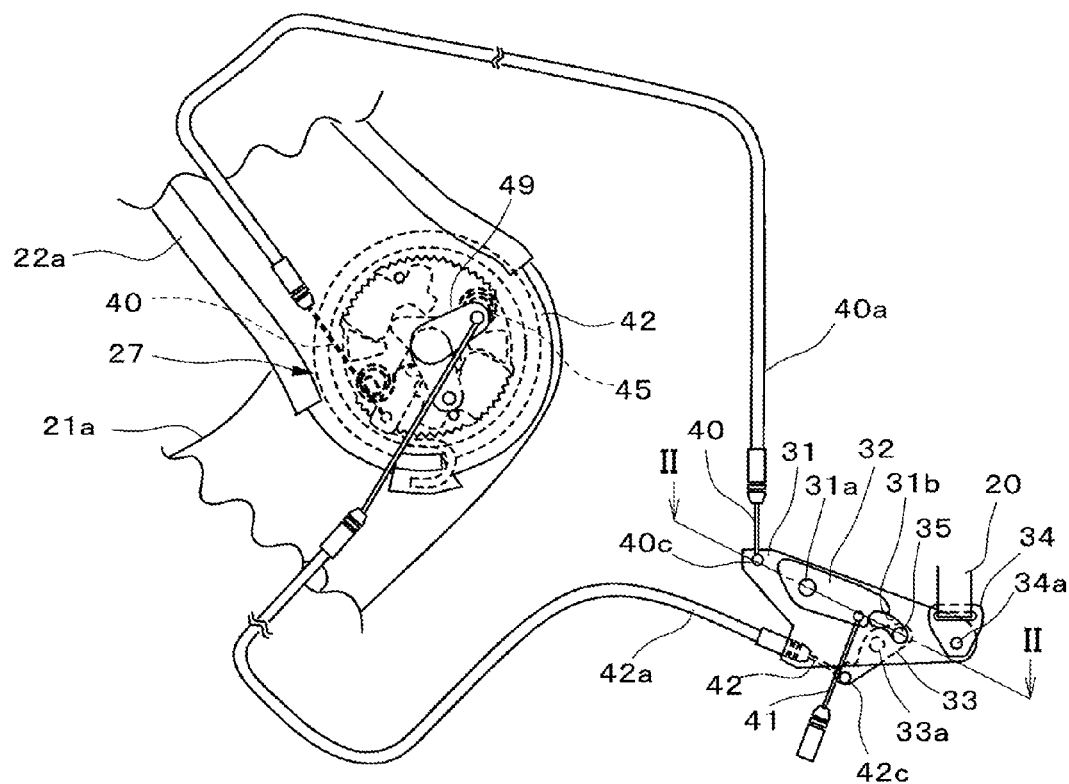
FIG. 8 is an enlarged explanatory side view of a link mechanism at the time of folding of a seat back in accordance with a first embodiment of the present invention.
Figure 9:
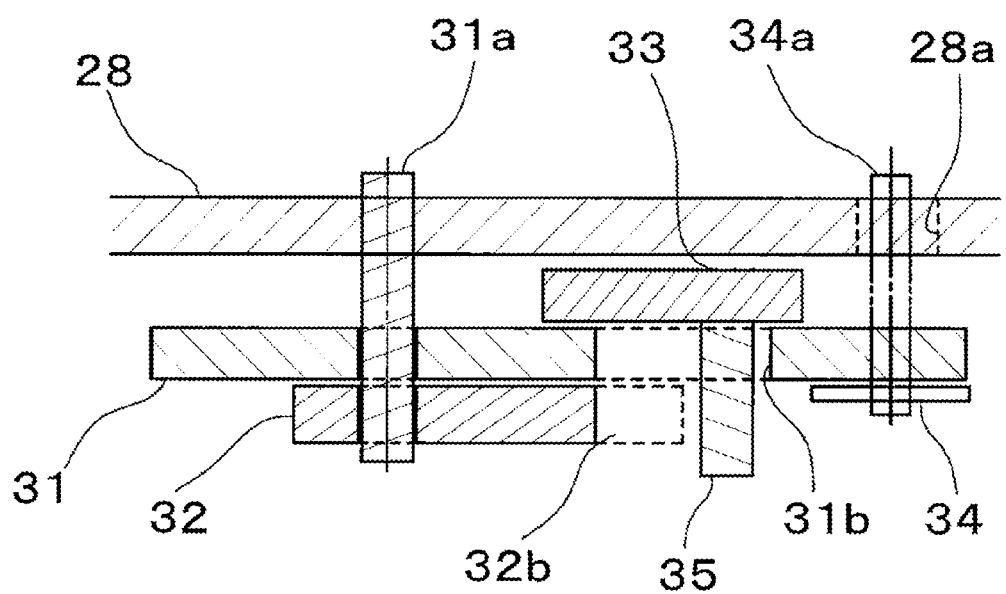
FIG. 9 is a sectional explanatory top view of a link mechanism in accordance with a first embodiment of the present invention, the view being taken along the line II-II of FIG. 8.

As shown in FIG. 8, the other end part side of the reclining releasing wire 40 locked to the locking part 40c of the first link member 31 is guided by a reclining releasing cable 40a and is connected to the reclining mechanism 27 that releases the locked state of rotating of the seat back 12.

The reclining mechanism 27 is a mechanism for releasing the locked state of rotating of the reclining mechanism 27 to make the seat back 12 in a rotatable state when the reclining releasing wire 40 is pulled to the link mechanism 30 side by the operation of the link mechanism 30. The other end part side of the strap 20 connected to the end part side of the first link member 31 via the strap connecting member 34 is extended from the strap outlet part 20a provided on the back surface of the seat back 12 to the outside of the seat back 12 to make the operation performed by the passenger easy. In association with the operation of the strap 20 performed by the passenger, the power (the operating force of the passenger) can be transmitted to the first link member 31.

That is to say, when the strap 20 is operated, the first link member 31 is rotated, and the locking of the reclining mechanism 27 is released.

The second link member 32 is a substantially rectangular member, and is disposed on the first link member 31.

The end part side on which the reclining releasing wire 40 is mounted is pivotally supported to be rotatable coaxially with the first link member 31 by the first shaft part 31a. On the other end part side, a locking recess 32b that is in contact with a locking protrusion 35, described below, is formed. Between the first shaft part 31a and the locking recess 32b, a locking part 41c to which the leg releasing wire 41 is locked is formed.

The other end part side of the leg releasing wire 41 locked to the second link member 32 as the power transmitting member is explained below.

The other end part side of the leg releasing wire 41 locked to the locking part 41c of the second link member 32 is guided by a leg releasing cable 41a and is connected to a leg locking releasing mechanism serving as a leg locking assembly. The leg locking releasing mechanism is formed in the front leg frame 24, and releases the locking to the leg striker 44 on the vehicle body floor 4 side by turning the locking claws 43 connected to the leg releasing wire 41 around a locking claw rotating shaft 43a when the leg releasing wire 41 is pulled to the link mechanism 30 side by the operation of the link mechanism 30. When the leg locking releasing mechanism is released, the seat cushion 11 becomes in a state of being rotatable in the front and rear direction.

The leg releasing wire 41 is urged to the locking claw 43 side by an urging spring 45, 45.

The third link member 33 is a substantially rectangular member, being disposed between the first link member 31 and the back plate 28, and the central part thereof is rotatably supported on the first link member 31 side by the second shaft part 33a.

To the lower end part side of the third link member 33, the cancel wire 42 is locked via a locking part 42c.

On the upper end part side, the cylindrical locking protrusion 35 is formed. This locking protrusion 35 is inserted through the arc-shaped elongated hole 31b formed in the first link member 31 and is in contact with the locking recess 32b of the second link member 32, so that the second link member 32 is locked to rotate together with the first link member 31. The locking protrusion 35 is formed to have an outside diameter slightly smaller than the width of the elongated hole 31b. On the other hand, the elongated hole 31b is formed in an arcuate shape to draw a circle concentric with the second shaft part 33a as described above. Therefore, the configuration is made such that the locking protrusion 35 moves along the elongated hole 31b with the rotating of the third link member 33.

The other end part side of the cancel wire 42 locked to the third link member 33 as the power transmitting member is explained below.

As shown in FIG. 8, the other end part side of the cancel wire 42 locked to the locking part 42c of the third link member 33 is guided by a cancel cable 42a and is connected to a locking rib 49 formed in the reclining mechanism 27, which is the connecting part between the side frame 22a and the back frame support part 21a. The locking rib 49 is formed on the reclining mechanism 27, and is mounted to rotate together with the side frame 22a. The other end part side of the cancel wire 42 is configured so that the locking rib 49 pulls the locking part 42c formed in the third link member 33 via the cancel wire 42 in the state in which the seat back 12 is folded, and functions as a detecting element by rotating the third link member 33. That is to say, the reclining assembly has the reclining mechanism 27 and the detecting element.

In this embodiment, the locking rib 49 locked to the other end part side of the cancel wire 42 is formed on the reclining mechanism 27. However, any other locking part may be used as far as the configuration is made such that the cancel wire 42 is operated in the state in which the seat back 12 is folded over the seat cushion 11. Further, the locking rib 49 may be formed in a portion separate from the reclining mechanism 27. In this case, the reclining assembly is configured so that the reclining mechanism 27 and the detecting element are provided in separate portions.

In the state in which the third link member 33 is not rotating, the second link member 32 is locked to the first link member 31 by the locking protrusion 35, and can pull the leg releasing wire 41 by rotating with the rotating of the first link member 31.

When the third link member 33 is rotated, the locking protrusion 35 fixed to the third link member 33 moves along the elongated hole 31b. By the movement of the locking protrusion 35, the locking recess 32b is made to not be in contact with the locking protrusion 35. Therefore, the locking of rotating of the first link member 31 and the second link member 32 is released.

At this time, a state in which the second link member 32 does not rotate even if the first link member 31 is rotated by the operation of the strap 20 is formed, and the leg releasing wire 41 having been locked to second link member 32 becomes in a state of being not pulled even if the first link member 31 rotates.

That is to say, in the state in which the seat back 12 is folded, the configuration is such that even if the strap 20 is pulled, the locking of the front leg 14 to the vehicle body floor 4 is not released. In other words, by rotating of the third link member 33, a state in which the second link member 32 cannot rotate can be formed.

On the locking releasing mechanism side (the other end part side of the link mechanism 30) to which the reclining releasing wire 40 and the leg releasing wire 41 are connected, the urging spring 45 is provided to urge the reclining releasing wire 40 and the leg releasing wire 41 to the direction of holding in the locked state. Therefore, in the state in which the passenger does not operate the strap 20, concerning the first link member 31 and the second link member 32 as well, the rotating of the link mechanism 30 is urged to the direction such that the strap 20 is pulled downward via the strap connecting member 34.

In this embodiment, the locking part 34a of the strap connecting member 34 provided on the first link member 31 pivotally supports the strap connecting member 34 on the first link member 31 to be rotatable, and also the other end side (the back side) thereof is inserted through a guide hole part 28a formed in the back plate 28. The guide hole part 28a is formed in an arcuate shape to draw a part of a circle concentric with the first shaft part 31a, so that the locking part 34a can move in the guide hole part 28a with the operation of the first link member 31. Also, by adjusting the length of the guide hole part 28a, the upper and lower limits of rotating amount of the first link member 31 can be set.

End part members 40b and 41b, which are end parts on the link mechanism 30 side of the reclining releasing cable 40a and the leg releasing cable 41a for guiding the reclining releasing wire 40 and the leg releasing wire 41, respectively, are fixed onto the back plate 28 by locking members (not shown).

An end part member 42b on the link mechanism 30 side of the cancel cable 42a for guiding the cancel wire 42 is fixed to the first link member 31 by a locking member (not shown).

Next, the stowage/restoring operation of the seat S of this embodiment and the operation of the link mechanism 30 are explained below with reference to FIGS. 10 to 13.

First, the stowing operation of the seat S is explained with reference to FIGS. 10A to 10F.

Figure 10A:
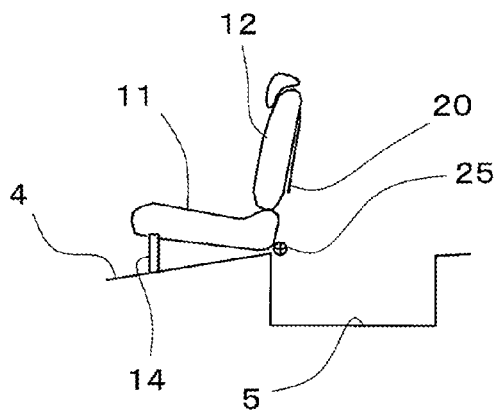
FIGS. 10A-10F are explanatory side views showing an operation procedure at the time of stowing operation of a seat in accordance with a first embodiment of the present invention.

FIG. 10A shows the state in which the seat S is set. The strap 20 is extended from the back surface side of the seat back 12.

Figure 10B:
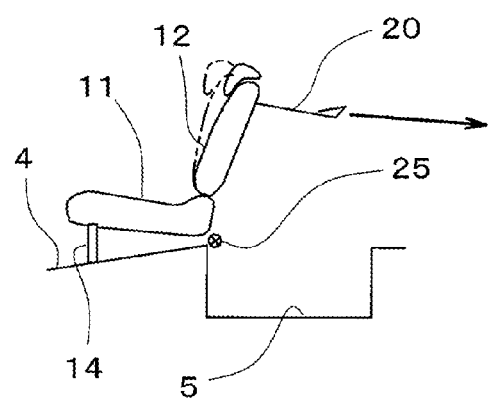

FIG. 10B shows the state in which the locking of the reclining mechanism 27 is released. When the passenger pulls the strap 20 to the rear, the locking of the reclining mechanism 27 is released.

At this time, the seat back 12 to which the strap 20 is mounted is being urged to the front direction by the urging spring mounted on the reclining mechanism 27. Since the configuration is made such that if the strap 20 is pulled against the urging direction, the locking of the locking claws 43 of the front leg 14 is released by a stress lower than the stress such as to fold the seat back 12 to the rear, the locking of the locking claws 43 is released.

Figure 10C:
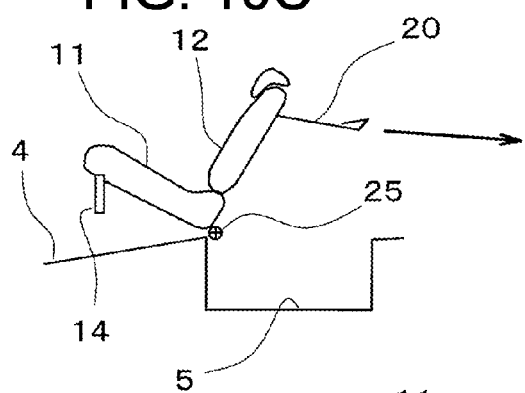

FIG. 10C shows the state in which the locking of the locking claws 43 of the front leg 14 has been released. The locking of the locking claws 43 of the front leg 14 is released, so that the seat S can be rotated to the rear.

Figure 10D:
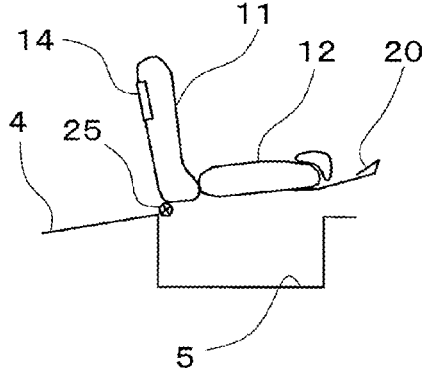
Figure 10E:
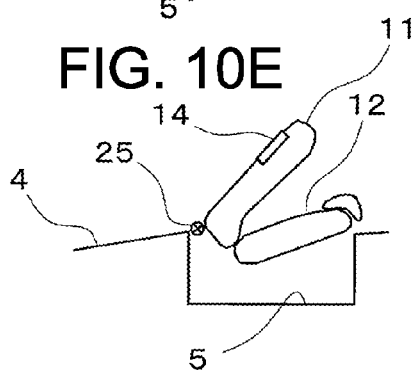

FIGS. 10D and 10E show the state in which the rearward rotating of the seat S is advanced. By pulling the strap 20 further, the seat S is rotated so that the center of gravity of the seat S goes beyond the middle point, and thereafter is rotated to the rear by its own weight, reaching a stowed state. At this time, the rearward rotating speed of the seat S is decreased by the urging spring 48 (the spiral spring) mounted on the seat support part 25, so that the shock caused by the stowage into the stowage recess 5 is buffered. Also, the front leg 14 is folded to the seat cushion 11 side by its own weight. At this time, the seat back 12 is also folded by the urging spring mounted on the reclining mechanism 27, and is put on the seat cushion 11 in a folded manner.

Figure 10F:
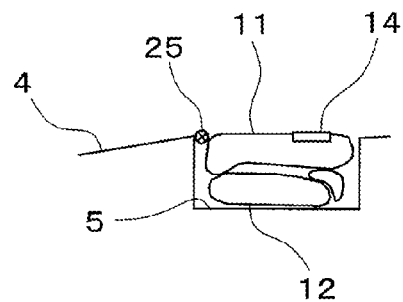

FIG. 10F shows the stowage state of the seat S. The opening part of the stowage recess 5 forms a flat surface integrally with the back surface of the seat cushion 11, so that a spacious cargo room is secured.

That is to say, merely by pulling the strap 20 to the rear by the passenger, the seat S in a set state can be stowed.

To keep the stowage state with more certainty, a locking mechanism may be provided between the vehicle floor 4 part of the stowage recess 5 and the seat S.

The operation of the link mechanism at the time of the above-described stowing operation of the seat S is explained with reference to FIGS. 11A, 11B and 11C.

FIG. 11A shows the state of the link mechanism 30 at the time when the seat S is set (refer to FIG. 10A). This state is a state before the strap 20 is operated by the passenger. This state of the link mechanism 30 is referred to as the original position.

FIG. 11B shows the state of the link mechanism 30 at the time when the locking of the reclining mechanism 27 is released (see FIG. 10B). This state is a state in which the strap 20 is pulled slightly to the rear. By the operation of the strap 20, the first link member 31 is rotated in the direction of being pulled by the strap 20. Therefore, the reclining releasing wire 40 is pulled with the rotating, and the locking of the reclining mechanism 27 is released. At this time, the seat back 12 is in a state of being raised with respect to the seat cushion 11. Therefore, the cancel wire 42 is not pulled, and the second link member 32 rotates together with the first link member 31, whereby the leg releasing wire 41 is also pulled. However, a setting is made so that the locking of the locking claws 43 for connecting the front leg 14 to the vehicle body floor 4 side is not released by the pulling amount in this state, so that the locking of the leg is kept.

FIG. 11C shows the state of the link mechanism 30 at the time when the locking of the reclining mechanism 27 and the locking claws 43 of the front leg 14 has been released (see FIGS. 10C and 10D), showing the state in which the strap 20 is further pulled. Compared with the state shown in FIG. 11B (see FIG. 10B), the first link member 31 is also rotated greatly by strongly pulling the strap 20. The second link member 32 also rotates together with the first link member 31, and therefore the reclining releasing wire 40 and the leg releasing wire 41 are pulled further. At this time, the locking of the leg is released.

After the seat S has been stowed, when the operation of the strap 20 is stopped, the state shown in FIG. 11A is restored by the urging spring 45 mounted on the locking releasing mechanism side (the other end part side of the link mechanism 30) to which the reclining releasing wire 40 and the leg releasing wire 41 are connected. However, since the seat back 12 is stowed in a state of being folded over the seat cushion 11 (see FIGS. 10E and 10F), the cancel wire 42 is pulled, and the third link member 33 is still held in a state of being rotated.

Next, the restoring operation of the seat S is explained with reference to FIGS. 12A to 12E.

Figure 12A:
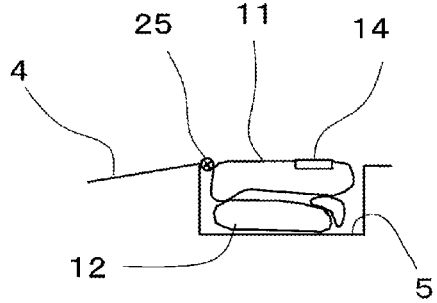
FIGS. 12A-12E are explanatory side views showing an operation procedure at the time of restoring operation of a stowable vehicle seat in accordance with a first embodiment of the present invention.

FIG. 12A shows the state in which the seat S has been stowed. When the seat S is pulled out of the stowage recess 5, the seat S is rotated to the front around the rotating shaft 25*a*.

Figure 12B:
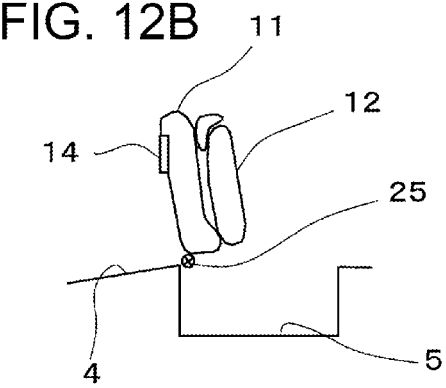

FIG. 12B shows the state at the time when the seat S is rotated to the front. With the forward rotating of the seat S, the front leg 14 is deployed to the front by its own weight.

Figure 12C:
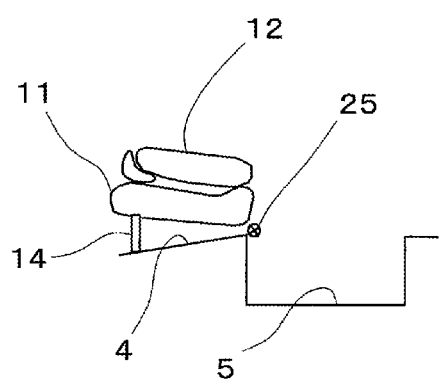

FIG. 12C shows the state in which the locking claws 43 of the front leg 14 of the seat S are locked to the vehicle body floor 4 side. The locking claws 43 are locked to the leg striker 44 on the vehicle body floor 4 side by pressing due to the own weight of the seat S. At this time, the seat back 12 is in a state of being folded over the seat cushion 11.

Figure 12D:
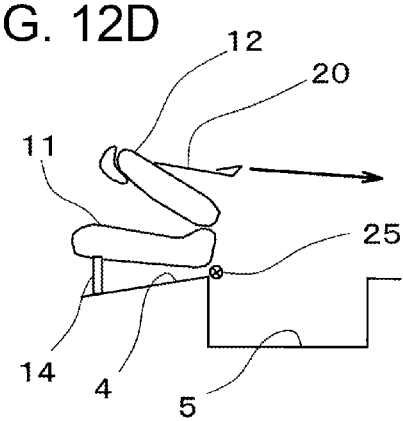

FIG. 12D shows the operation for pulling the strap 20 to the rear from the state in which the locking claws 43 of the front leg 14 of the seat S are locked to the vehicle body floor 4 side. At this time, the locking claws 43 are kept in a locked state, so that only the seat back 12 can be raised with respect to the seat cushion 11.

Figure 12E:
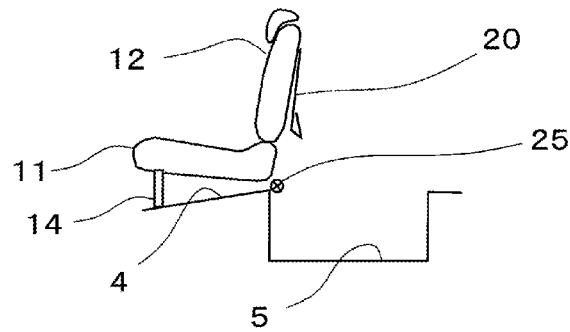

FIG. 12E shows the state in which the restoring operation of the seat S has been finished.

After the seat S in the stowage state in which the seat back 12 is folded has been rotated to the front, the seat S can be restored merely by pulling the strap 20 to the rear by the passenger.

The operation of the link mechanism 30 at the time of the above-described restoring operation of the seat S is explained with reference to FIGS. 13A, 13B and 13C.

Figure 13A:
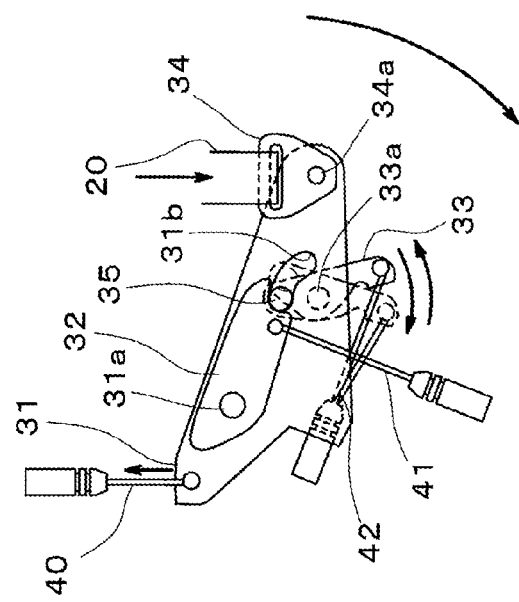
FIGS. 13A-13C are explanatory side views for explaining operation of a link mechanism at the time of restoring operation of a seat in accordance with a first embodiment of the present invention.

FIG. 13A shows the state of the link mechanism 30 at the stage at which the seat S is rotated from the stowage state of the seat S (see FIG. 12A) and the locking claws 43 are locked to the vehicle body floor 4 side (see FIG. 12C). This stage is a stage before the strap 20 is operated by the passenger. Since the operation is performed in the state in which the seat back 12 is folded, the state in which the cancel wire 42 is pulled and the third link member 33 is rotated is held.

Figure 13B:
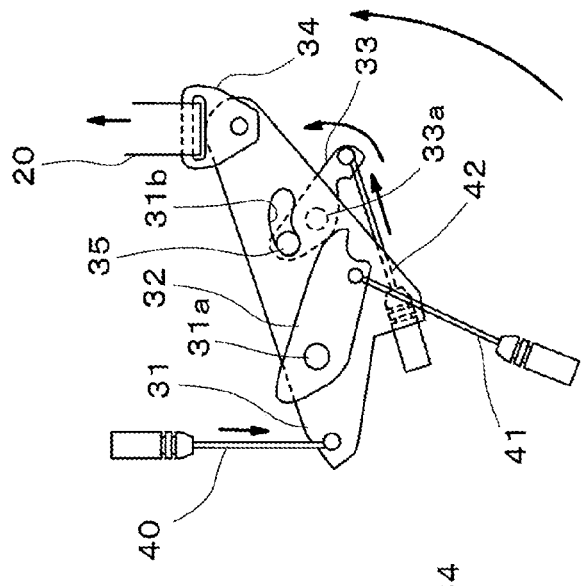

FIG. 13B shows the stage at which the strap 20 is pulled slightly to the rear to raise the seat back 12 (see FIG. 12D). By the operation of the strap 20, the first link member 31 is rotated. With the rotating, the reclining releasing wire 40 is pulled, and thereby the locking of the reclining mechanism 27 is released, so that the seat back 12 can be rotated to the rear. At this time, since the locking protrusion 35 moves together with the third link member 33, even if the first link member 31 rotates, the second link member 32 is not locked and is in a state of being unable to rotate. Also, with the raise of the seat back 12, the rotating amount of the third link member 33 decreases. However, the third link member 33 rotates exceeding the rotating range in which the locking protrusion 35 comes into contact with the second link member 32, so that the locking recess 32*b* of the second link member 32 is kept in a state of not being locked to the first link member 31. Therefore, the state in which the locking of the locking claws 43 for connecting the front leg 14 to the vehicle body floor 4 side is not released is held, so that the seat back 12 can be raised with respect to the seat cushion 11 merely by pulling the strap 20.

Figure 13C:
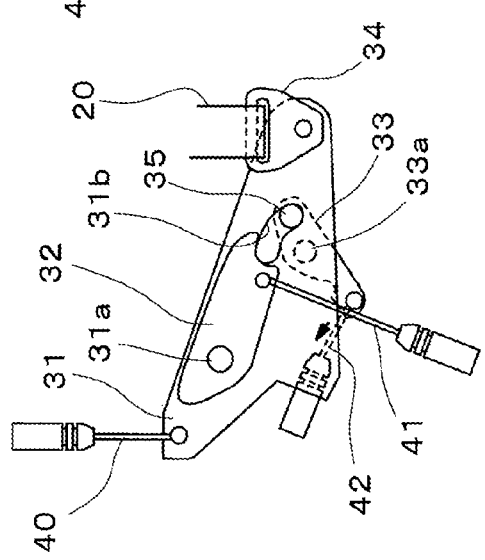

FIG. 13C shows the state in which the restoring operation of the seat S has been finished (see FIG. 12E). When the rearward pulling operation of the strap 20 is stopped, the position of the first link member 31 is also returned to the original position by the urging from the reclining releasing wire 40 and the leg releasing wire 41. At this time, since the seat back 12 is raised with respect to the seat cushion 11, the third link member 33 is in a state of not being pulled by the cancel wire 42. Therefore, even by a minute stress, the third link member 33 can be rotated. The second link member 32 is also returned to the original position again and is locked to the first link member 31, and the link members of the link mechanism 30 are restored to the state of original position.

Figure 14:
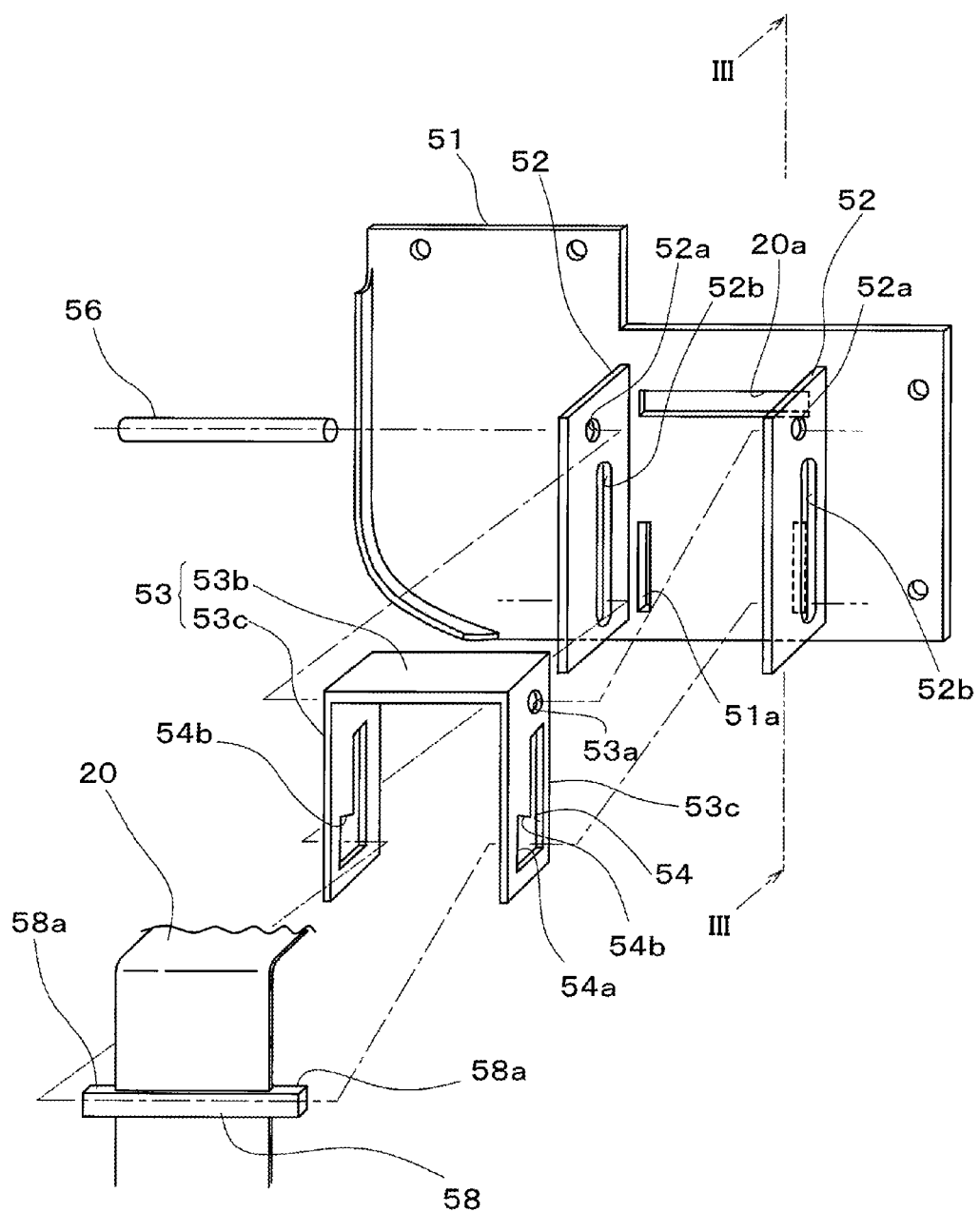
FIG. 14 is an exploded perspective view of a stopper mechanism in accordance with a first embodiment of the present invention.

Successively, the configuration of the stopper mechanism 50 and the operation thereof during the time when the stowable seat is operated are explained with reference to FIGS. 14 to 16.

First, the configuration of the stopper mechanism 50 is explained with reference to FIG. 14.

The stopper mechanism 50 is a mechanism for inhibiting the transmission of power (the operating force of the passenger) from the strap 20 to the link mechanism 30 in the case where the strap 20 is operated by erroneous operation, and is formed on the stopper bracket 51 as described above.

The stopper mechanism 50 is configured to include the stopper bracket 51 fixed to the central frame 22*b*, a pair of substantially rectangular bracket parts 52 disposed to be erect on the stopper bracket 51, a rocking member 53 disposed between the paired bracket parts 52, 52, a rocking shaft 56 that rockably supports the rocking member 53 between the brackets 52, 52 and a braking member 58 fixed to the strap 20.

The stopper bracket 51 is a steel-made or resin-made member that is fixed to the upper part of the central frame 22*b* by using fastening members such as screws or rivets or by welding, and is formed with the strap outlet part 20*a* for guiding the strap 20 from the back side of the seat S to the outside. In positions on both sides of the strap outlet part 20*a*, the bracket parts 52, 52 are formed to be raised on the stopper bracket 51. On the lower side of the strap outlet part 20*a*, slits 51*a* are provided in portions butting against plate bodies 53*c* of the rocking member 53 to adjust the rocking amount (rocking angle) of the rocking member 53.

To the strap outlet part 20*a*, a resin-made outlet frame 20*b* (not shown) is attached to prevent the strap 20 from touching the strap outlet part 20*a* and being damaged. Also, the configuration can be made such that the slits 51*a*, 51*a* are not formed by changing the shape of the rocking member 53.

The bracket parts 52, 52 which are resin-made or steel-made members formed in an erect manner on the stopper bracket 51 as described above, is installed by welding or by using fastening members such as screws. Alternatively, the bracket parts 52, 52 may be formed by bending a part of the stopper bracket 51 or may be integrally molded by resin molding. The bracket parts 52, 52 are substantially rectangular plate-shaped members disposed on both sides of the strap outlet part 20*a*, and each are formed with a shaft hole 52*a*, 52*a* through which the rocking shaft 56 is inserted, in the upper part thereof, and are formed with an elongated hole 52*b*, 52*b* which serves as a first elongated hole that is long in the up and down direction, in the central part thereof.

The rocking member 53, which is a member having a substantially U-shaped cross section in front view, is made up of the pair of right and left plate bodies 53*c*, 53*c* and an upper plate 53*b* serving as a connecting member for connecting the two plate bodies 53*c* to each other in the upper part. The plate body 53*c*, 53*c* is formed to be smaller in size than the bracket part 52, 52 and is formed especially so that the width thereof in the front and rear direction is small. The plate body 53*c*, 53*c* is formed with a shaft hole 53*a*, through which the rocking shaft 56 is inserted, on the upper side thereof, and is formed with a braking hole 54, which serves as a second elongated hole that is long in the up and down direction, in the central part thereof.

The braking hole 54 is a substantially L-shaped hole because a substantially rectangular expanded-width part 54*a* expanded to the front on the lower side of the braking hole 54 is formed.

The braking member 58 is a metal-made or resin-made member having a prismatic shape or a cylindrical shape, which is fixed to the strap 20. The braking member 58 is fixed to the strap 20 by using an adhesive or by using fastening members such as bolts and nuts so that the strap 20 is inserted through the shell part of the braking member 58 in the lengthwise direction with respect to the width direction of the strap 20. Also, braking member 58 is formed so that the length in the lengthwise direction thereof is greater than the width of the strap 20, and has convex parts 58a projecting to both sides in the width direction of the strap 20.

In the state in which the strap 20 is not operated, the strap 20 is urged downward by the link mechanism 30, so that a state in which the convex parts 58a come into contact with the lower sides of the braking holes 54 and the rocking member 53 is urged downward is formed. By this urging of the rocking member 53, an abnormal sound or a play at the time of non-operation is prevented.

Figure 15A:
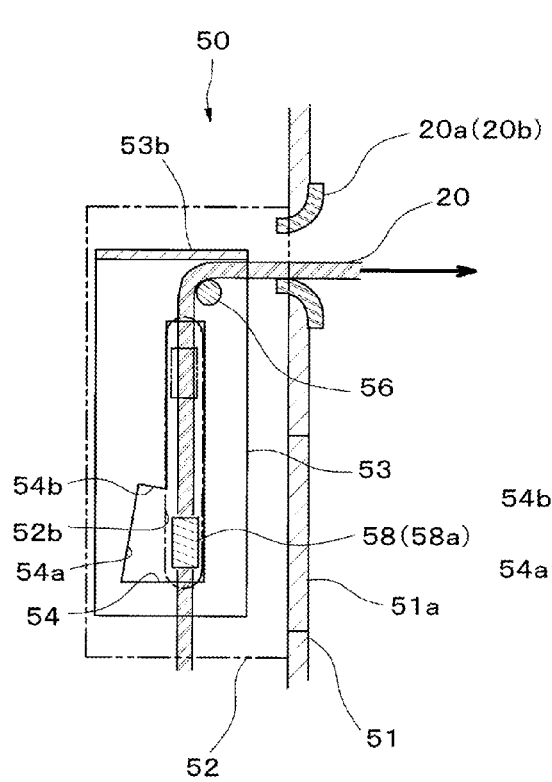
FIGS. 15A, 15B are explanatory sectional views taken along the line III-III of FIG. 14 for explaining operation of a stopper mechanism in accordance with a first embodiment of the present invention.

The relationship between the parts in a mounted state of the stopper mechanism 50 and the operation thereof are explained below with reference to FIGS. 15A and 15B. FIGS. 15A, B are sectional views for explaining the operation, taken along the line III-III of FIG. 14.

First, the rocking member 53 is pivotally supported on the bracket parts 52, 52 to be rockable by the rocking shaft 56. At this time, the elongated holes 52b, 52b and the braking holes 54, 54 are arranged to overlap on each other.

The convex parts 58a, 58a are insertedly attached to the braking holes 54, 54 and the elongated holes 52b, 52b and move up and down by being guided by the braking holes 54, 54 and the elongated holes 52b, 52b with the movement of the strap 20 on account of the stowage/restoring operation of the seat S performed by the passenger.

The strap 20, one side of which is mounted to the link mechanism 30 side, comes into contact with the rocking shaft 56 to be bent, and is guided to the strap outlet part 20a. At this time, the strap 20 comes into contact (sliding contact) with the lower side (the side on which the expanded-width part 54a is formed) of the upper plate 53b, or is disposed in such a manner that a minute gap is left, so that the rocking member 53 rocks in association with the movement of the strap 20.

FIG. 15A shows the state of the stopper mechanism 50 at the time of normal operation of the strap 20, showing the case where the strap 20 is pulled to the rear side with respect to the seat back 12.

In this case, since the strap 20 is pulled straight to the rear with respect to the seat back 12, the upper plate 53b is also kept horizontal, and the rocking member 53 is in a non-rocked state (normal position). At this time, the braking member 58 can move up and down in the elongated holes 52b, 52b and the braking holes 54, 54. Therefore, the power from the strap 20 can be transmitted to the link mechanism 30 side.

Figure 15B:
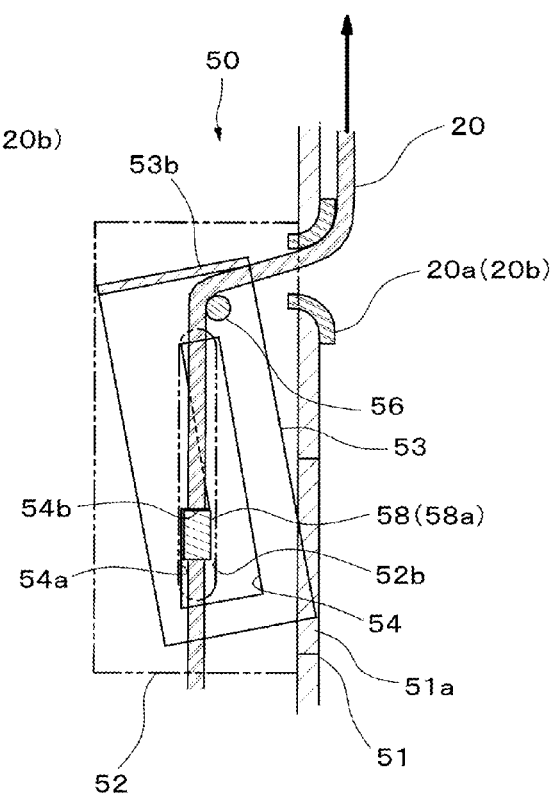

FIG. 15B shows the state of the stopper mechanism 50 at the time of erroneous operation of the strap 20, showing the case where the strap 20 extended to the back surface outside of the seat S is pulled upward with respect to the seat back 12.

In this case, the strap 20 comes into contact with the upper edge part of the strap outlet part 20a, and the strap 20 located between the rocking shaft 56 and the strap outlet part 20a tilts upward. Also, the inside of the upper plate 53b being in sliding contact with the strap 20 follows the tilt of the strap 20, so that the rocking member 53 becomes in a state of being rocked rearward (rocking position). With this rocking of the rocking member 53, upper edge parts 54b, 54b of the expanded-width parts 54a, 54a are disposed in the upward travel direction of the convex parts 58a, 58a of the braking member 58.

At this time, since the bracket parts 52, 52 are fixed to the stopper bracket 51 and do not move, the convex parts 58a inserted through the elongated holes 52b, 52b cannot move in the front and rear direction (rocking direction). Therefore, the convex parts 58a, 58a of the braking member 58 come into contact with the upper edge parts 54b, 54b so that the upward movement is restricted. Therefore, a state in which the power from the strap 20 cannot be transmitted to the link mechanism 30 side is formed.

The rocking member 53 rocked by erroneous operation stops the pulling operation, and thereby is restored to the normal position. However, in order to make the restoring operation with more certainty or to prevent a play or an abnormal sound, the configuration may be made such that an urging element such as an urging spring that urges the rocking member 53 to the normal position side is provided. Alternatively, a part of a member for adjusting the position of the center of gravity of the rocking member 53 may be scraped, or a weight may be installed.

In this embodiment, the configuration is such that the rocking member 53 is disposed between the bracket parts 52, 52. However, the brackets 52, 52 may be disposed between the plate bodies 53c, 53c of the rocking member 53.

Figure 16A:
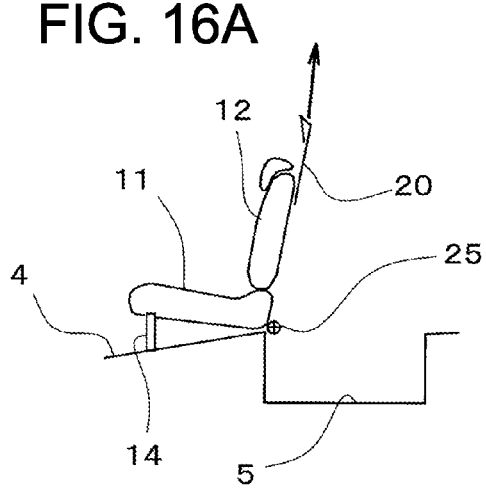
FIGS. 16A-16C are explanatory side views of a seat arrangement in which a stopper mechanism of a seat in accordance with a first embodiment of the present invention achieves an effect.
Figure 16B:
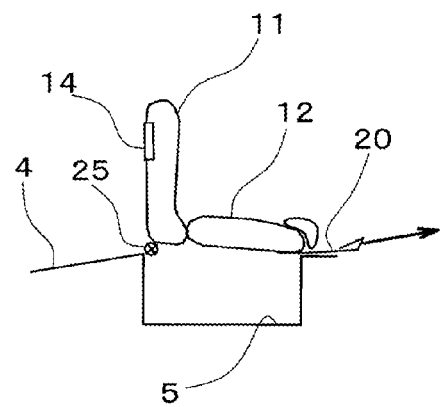
Figure 16C:
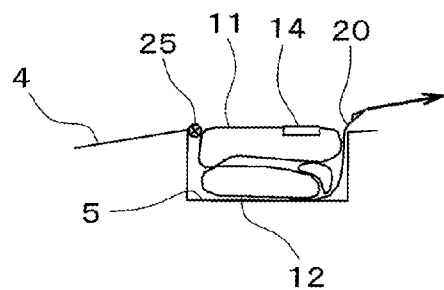

FIGS. 16A to 16C show a seat arrangement that prevents erroneous operation by using the stopper mechanism 50 of this embodiment.

FIG. 16A shows the case where the strap 20 is pulled upward on the seat S in a set state. In this case, the stopper mechanism 50 operates, so that the locking of the reclining mechanism 27 and the front leg 14 is not released. This case assumes erroneous operation caused by improper and unintentional operation of a child or the like.

When the locking of the reclining mechanism 27 is released in this state, the seat back 12 becomes in a state of being rotatable to the front or the rear. Therefore, there is a fear that the seat back 12 may move unexpectedly for the operator of the strap 20 and other passengers. Also, when the locking of the front leg 14 to the vehicle floor 4 side is released, the seat S may rotate to the rear. In either case, erroneous operation is prevented by the operation of the stopper mechanism 50.

FIG. 16B shows the case where the strap 20 is pulled upward with respect to the seat back 12 (rearward with respect to the vehicle body direction) in the state in which the seat S is used as an open bench. In this case, the stopper mechanism 50 operates, so that the locking of the reclining mechanism 27 is not released.

The open bench means a seat that is set to be directed to the opened rear door side. In this embodiment, the seat back 12 in a state of being raised with respect to the seat cushion 11 is rotated rearward and is kept in a state of being brought into contact with the vehicle body floor 4 (the edge part of the stowage recess 5), and on the other hand, the seat back 12 is used as a seat cushion and the seat cushion 11 is used as a seat back, whereby the seat S can be directed to the rear door side.

When the locking of the reclining mechanism 27 is released in this state, the seat S may rotate to the stowage position.

FIG. 16C shows the case where the strap 20 is pulled upward with respect to the seat back 12 from the state in which the seat S is stowed. In this case as well, the stopper mechanism 50 operates so that the locking of the reclining mechanism 27 is not released.

Even if the locking of the reclining mechanism 27 is released in this state, a hindrance is not especially caused in the case of the seat S of this embodiment. However, for a seat provided with a mechanism for assisting the restoring operation from the stowage time, the movement of the seat for the passenger sometimes becomes an unexpected movement.

For example, in the case of a seat provided, as an assisting mechanism, with an urging element, such as a spring, that urges the seat back 12 in the direction such that the seat back 12 is raised with respect to the seat cushion 11, when the locking of the reclining mechanism 27 is released, the seat back 12 is rotated by the urging element in the direction such that the seat back 12 is raised. Therefore, the seat cushion 11 rises from the stowage recess 5.

Second Embodiment

FIGS. 17A-18B are explanatory side views for explaining operation of a stopper mechanism 70 in accordance with a second embodiment of the present invention.

In the embodiment described below, the same symbols are applied to members, arrangements, and the like that are the same as those in the first embodiment, and the detailed explanation thereof is omitted.

Figure 17A:
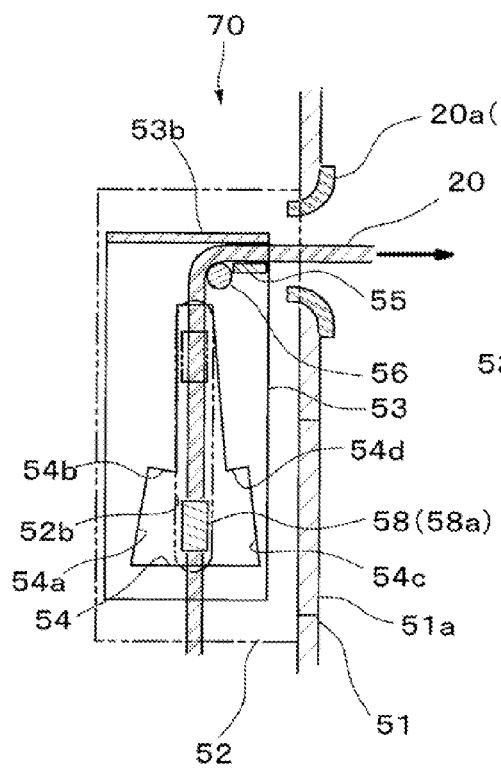
FIGS. 17A, 17B are explanatory side views for explaining operation of a stopper mechanism in accordance with a second embodiment of the present invention.
Figure 17B:
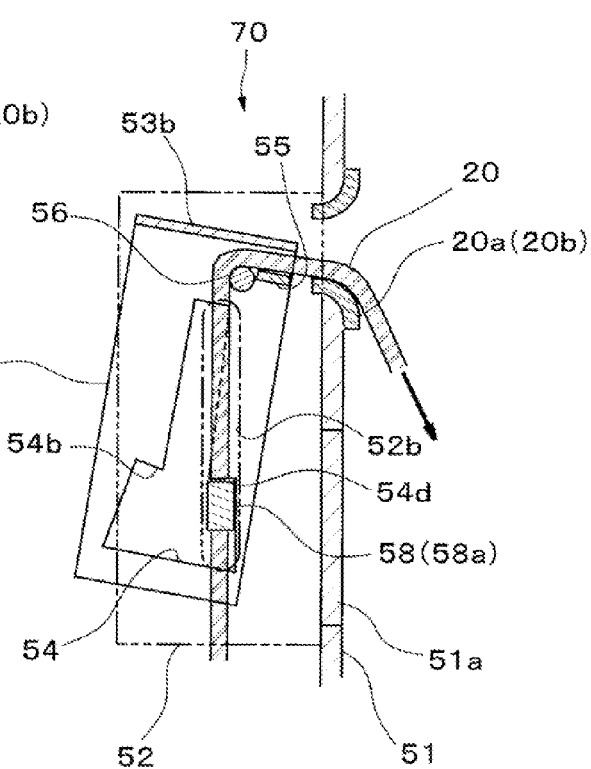

The stopper mechanism 70 shown in FIGS. 17A, B is formed with expanded-width parts 54a and 54c on both sides in the rocking direction of the braking hole 54, and a lower plate 55 serving as a rib is provided on the lower side of the upper plate 53b of the rocking member 53. Also, between the upper plate 53b and the lower plate 55, the strap 20 is insertedly disposed with a proper gap being left, the gap allowing the strap 20 to be in sliding contact with either of the upper plate 53b and the lower plate 55. The lower plate 55 need not be of a plate shape, and may be of a rod shape. Also, the lower plate 55 need not connect the plate bodies 53c, 53c to each other, and may be of a rib form.

When the strap 20 is pulled upward, like the operation in the first embodiment (refer to FIGS. 15A, B), the braking member 58 is locked to the upper edge part 54b of the expanded-width part 54a on the front side. On the other hand, when the strap 20 is pulled downward, the rocking member 53 rotates in the direction reverse to the direction in the case where the strap 20 is pulled upward, and the braking member 58 is locked to an upper edge part 54d of the expanded-width part 54a on the rear side.

By this configuration, the stopper mechanism 70 is operated even when the strap 20 is pulled not only upward but also downward, whereby power can be prevented from being transmitted to the link mechanism 30.

In this embodiment, the stopper mechanism 70 may operate even at the time of operation for raising the seat back 12, which is in a state of being folded over the seat cushion 11 at the time of seat restoring operation, with respect to the seat cushion 11 (refer to FIG. 12D). Therefore, by tilting the braking holes 54, 54 in which the expanded-width parts 54c, 54c are formed, downward to widen the width thereof, the configuration is made such that the operation range of the stopper mechanism 70 is narrowed concerning the downward pulling operation of the strap 20.

Also, even if the configuration is made such that the lower side of the braking hole 54 is expanded to the bottom part of the rocking member 53 and the braking hole 54 is opened to the lower side as shown in FIGS. 18A, B, the same effect as describe above can be achieved. In this case, to prevent an abnormal sound or a play at the time when the strap 20 is not operated, it is desirable to provide an urging element for holding the rocking member 53 in a fixed position. In the embodiment shown in FIGS. 18A, B, the configuration is made such that a washer 56a is mounted to the shaft part to urge the rocking member 53 to the side to increase the frictional force with the bracket part 52.

Third Embodiment

Figure 19:
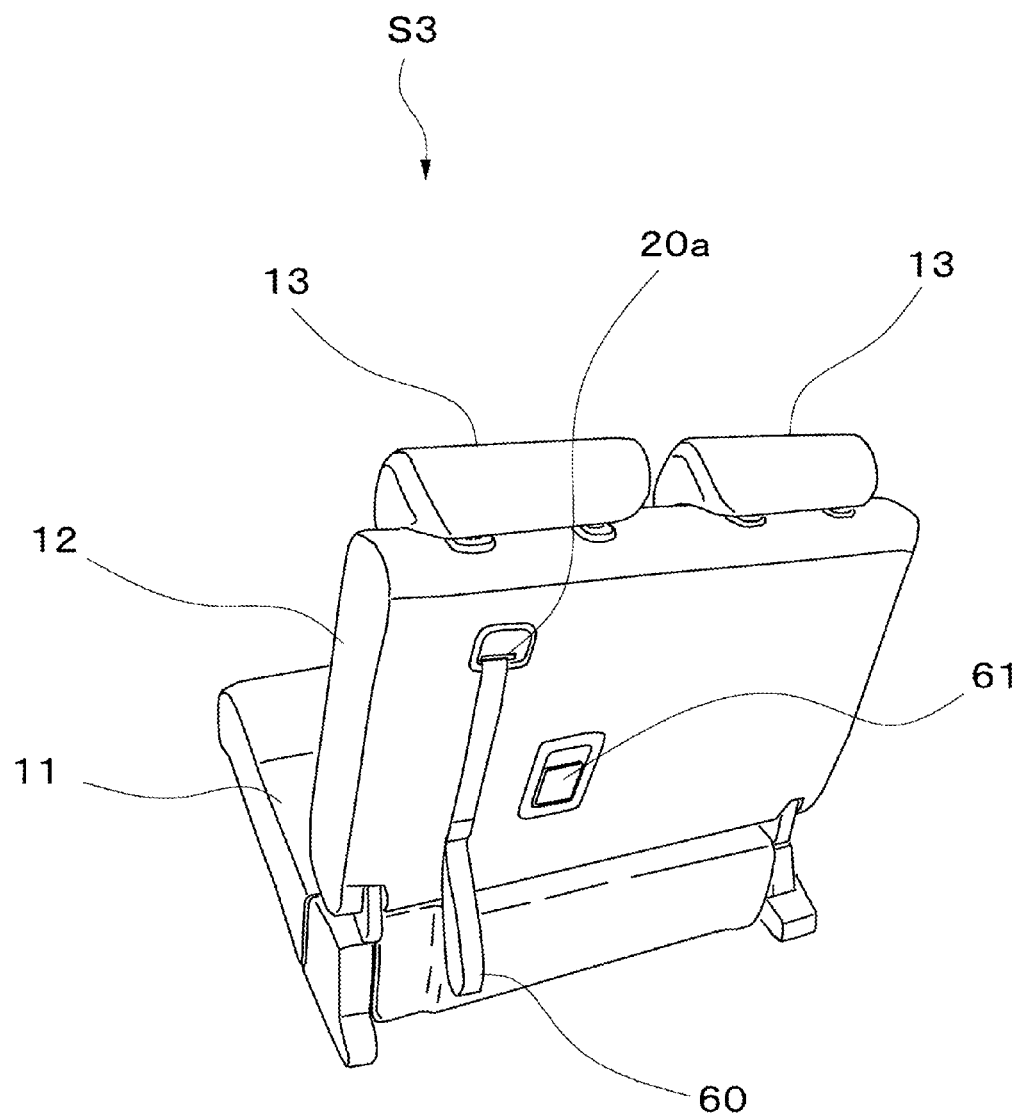
FIG. 19 is a rear perspective view of a seat in accordance with a third embodiment of the present invention.
Figure 20:
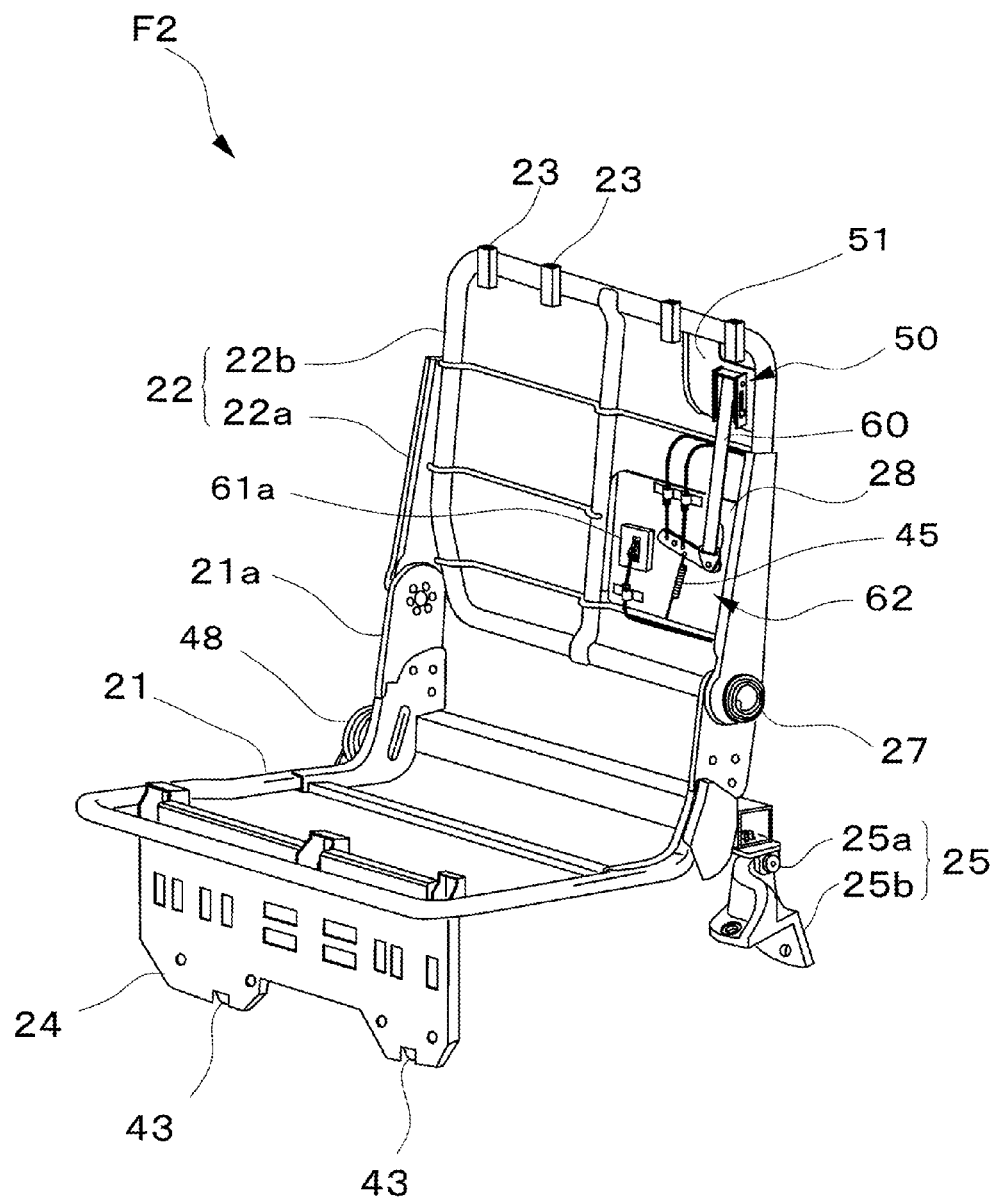
FIG. 20 is a schematic perspective view of a seat frame in accordance with a third embodiment of the present invention.

FIGS. 19 and 20 show a third embodiment of the present invention. FIG. 19 is a rear perspective view of a seat S3, and FIG. 20 is a schematic perspective view of a seat frame F2.

In the embodiment described below, the same symbols are applied to members, arrangements, and the like that are the same as those in the first embodiment, and the detailed explanation thereof is omitted.

The seat S3 shown in FIG. 19 has a strap 60 and a lever 61 as the stowage/restoring operation assembly.

FIG. 20 shows the seat frame F2 for the seat S3 shown in FIG. 19. The seat frame F2 includes a link mechanism 62 and a lever mechanism 61a.

The seat S3 is configured so that when the strap 60 is pulled, the locking of the reclining mechanism 27 is released via the link mechanism 62, and when the lever 61 is operated, the locking of the leg is released via the lever mechanism 61a.

As in the first embodiment, the stopper mechanism 50 is provided on the upper side of the central frame 22b, and is configured so that when the strap 60 extended from the back surface outside of the seat S3 is pulled upward, the stopper mechanism operates so that power is not transmitted to the link mechanism 62.

According to the seat S3 of the third embodiment described above, the operation and effects that are the same as those in the first embodiment can be achieved.

According to the erroneous operation preventive mechanism in accordance with embodiments of the present invention, when the strap that is operated at the time of seat stowage/restoring operation is pulled upward or downward with respect to the seat back, the transmission of operating force to the link mechanism can be prevented. Therefore, the operation that is not expected by the passenger, which is caused by erroneous operation such as improper and unintentional operation by a child, can be prevented. Also, at the time of seat arrangement as well, the seat movement that is not expected by the passenger, which is caused by erroneous operation, can be prevented.

Furthermore, by using the erroneous operation preventive mechanism in as described above, the certainty of seat operation is increased. Therefore, manual description and label indication and the like for calling attention to erroneous operation, which have been carried out conventionally, can be made unnecessary.

The above-described configurations can be combined with each other without departing from the spirit and scope of the present invention.

In the above-described embodiments, the third-row vehicle seat divided into the right and left has been explained as a specific example. However, the seat type is not limited to this type. Needless to say, the same configuration can be applied to a long bench type seat formed integrally, a passenger seat adjoining the driver's seat, and any other rear seat.

TABLE OF REFERENCE CHARACTERS

S, S3 seat
F, F2 seat frame
S1 right seat
S2 left seat
4 vehicle body floor
5 stowage recess
11 seat cushion 12 seat back
13 headrest
14 front leg
20, 60 strap
20a strap outlet part
20b outlet frame
21 seat cushion frame
21a back frame support part
22 seat back frame
22a side frame
22b central frame
23 pillar support part
24 front leg frame
25 seat support part
25a rotating shaft
25b rotating shaft bracket
27 reclining mechanism
28 back plate
28a guide hole part
30, 62 link mechanism
31 first link member
31a first shaft part
31b, 52b elongated hole
32 second link member
32b locking recess
33 third link member
33a second shaft part
34 strap connecting member
34a, 40c, locking part
41c, 42c
35 locking protrusion
40 reclining releasing wire
40a reclining releasing cable
40b, 41b, end part member
42b
41 leg releasing wire
41a leg releasing cable
42 cancel wire
42a cancel cable
43 locking claw
43a locking claw rotating shaft
44 leg striker
45 urging spring
48 spiral spring
49 locking rib
50, 70 stopper mechanism
51 stopper bracket
51a slit
52 bracket part
52a, 53a shaft hole
53 rocking member
53b upper plate
53c plate body
54 braking hole
54a, 54c expanded-width part
54b, 54d upper edge part
55 lower plate
56 rocking shaft
56a washer
58 braking member
58a convex part
61 lever
61a lever mechanism

The invention claimed is:

1. A stowable vehicle seat comprising:
an erroneous operation preventive mechanism using a strap for operation at a time when the stowable vehicle seat is folded, the erroneous operation preventive mechanism comprising:
a braking member fixed to the strap;
at least two brackets which are raised in any direction on a top and back surface sides of a seat back of the vehicle seat and are formed separately from each other; and
a rocking member comprising at least two plate bodies which are pivotally supported on the brackets to be rockable by a rocking shaft and are formed separately from each other, and a connector which connects the plate bodies to each other and is capable of coming into sliding contact with the strap,
at least one of the brackets being provided with a first elongated hole extending in the direction intersecting with the rocking direction of the rocking member,
the plate body of the rocking member being formed so that a second elongated hole extending in a direction intersecting with the rocking direction has an expanded-width part extending to a side reverse to the rocking direction of the rocking member due to the sliding contact of the strap with the connector, and
the braking member being inserted through the first elongated hole and the second elongated hole.

2. The stowable vehicle seat according to claim 1, wherein the connector of the rocking member is disposed to come into sliding contact with the strap on the side on which the expanded-width part is formed.

3. The stowable vehicle seat according to claim 1, wherein
a rib is formed between the right and left plate bodies, and
the rib is disposed to come into sliding contact with the strap on the side reverse to the side on which the expanded-width part is formed.

4. The stowable vehicle seat according to claim 1, wherein
the second elongated hole has an expanded-width part on both sides of the rocking direction, and
the strap is inserted between the connector and the rib to come into sliding contact with both of the connector and the rib.

5. The stowable vehicle seat according to claim 1, wherein by pulling the strap to an upside or a downside of the seat back, the connector or the rib is brought into sliding contact with the strap, and by rocking the rocking member to the back surface direction or to the top surface direction of the seat back, the braking member is locked to the expanded-width part, by which the movement of the strap is regulated.

* * * * *